US008506846B2

(12) United States Patent
Yuan et al.

(10) Patent No.: US 8,506,846 B2
(45) Date of Patent: Aug. 13, 2013

(54) CHAR SUPPORTED CATALYSTS FOR SYNGAS CLEANUP AND CONDITIONING

(75) Inventors: Wenqiao Yuan, Manhattan, KS (US); Duo Wang, Fujian (CN)

(73) Assignee: Kansas State University Research Foundation, Manhattan, KS (US)

( * ) Notice: Subject to any disclaimer, the term of this patent is extended or adjusted under 35 U.S.C. 154(b) by 0 days.

(21) Appl. No.: 13/697,736

(22) PCT Filed: May 20, 2011

(86) PCT No.: PCT/US2011/037358
§ 371 (c)(1),
(2), (4) Date: Nov. 13, 2012

(87) PCT Pub. No.: WO2011/146847
PCT Pub. Date: Nov. 24, 2011

(65) Prior Publication Data
US 2013/0058856 A1    Mar. 7, 2013

Related U.S. Application Data

(60) Provisional application No. 61/346,773, filed on May 20, 2010.

(51) Int. Cl.
*B01J 7/00* (2006.01)
*C01B 3/02* (2006.01)
*B01J 21/18* (2006.01)

(52) U.S. Cl.
USPC ............ 252/373; 48/61; 422/211; 502/182; 502/183; 502/184; 502/185

(58) Field of Classification Search
USPC ............ 422/211; 48/61; 252/373; 502/180, 502/182, 183, 184, 185, 174
See application file for complete search history.

(56) References Cited

U.S. PATENT DOCUMENTS

| 1,530,392 | A | * | 3/1925 | Morrell | 502/180 |
| 1,956,585 | A | * | 5/1934 | Oglesby et al. | 502/183 |
| 2,771,463 | A | * | 11/1956 | Field et al. | 526/110 |
| 2,802,814 | A | * | 8/1957 | Feller et al. | 526/103 |
| 2,808,443 | A | * | 10/1957 | Mertzweiller | 568/883 |
| 2,976,254 | A | * | 3/1961 | Mason et al. | 502/182 |
| 3,155,730 | A | * | 11/1964 | Eng | 568/396 |
| 3,367,862 | A | * | 2/1968 | Mason et al. | 208/243 |
| 3,775,286 | A | * | 11/1973 | Mukherjee et al. | 208/420 |
| 3,929,431 | A |   | 12/1975 | Koh et al. |   |
| 4,046,523 | A |   | 9/1977 | Kalina et al. |   |
| 4,440,546 | A | * | 4/1984 | Lancet et al. | 48/202 |

(Continued)

OTHER PUBLICATIONS

Wang, Duo et al., Applied Energy, vol. 88, pp. 1656-1663, Dec. 22, 2010.

(Continued)

*Primary Examiner* — Wayne Langel
(74) *Attorney, Agent, or Firm* — Hovey Williams LLP

(57) ABSTRACT

A catalyst comprising a physical mixture of particles of a catalytic material and particles of char is provided. The catalyst can be used in various processes, including the reforming of tars present in syngas generated during biomass gasification. The catalyst is produced through a mechanical mixing of the catalytic material and char particles, which results in significant time and energy savings over methods of catalyst preparation that involve impregnation and calcining of a support material.

12 Claims, 14 Drawing Sheets

(56) References Cited

U.S. PATENT DOCUMENTS

| | | | |
|---|---|---|---|
| 4,551,155 A | | 11/1985 | Wood et al. |
| 4,822,935 A | * | 4/1989 | Scott .............................. 585/240 |
| 4,865,625 A | * | 9/1989 | Mudge et al. ............... 48/197 R |
| 6,162,351 A | * | 12/2000 | Sudhakar et al. ....... 208/216 PP |
| 2005/0221976 A1 | * | 10/2005 | Chen et al. .................... 502/182 |
| 2009/0165380 A1 | * | 7/2009 | Lau et al. ..................... 48/127.7 |
| 2010/0121125 A1 | | 5/2010 | Hippo et al. |
| 2010/0137459 A1 | * | 6/2010 | Stites et al. ................... 518/704 |
| 2010/0243961 A1 | * | 9/2010 | Hilton et al. .................. 252/373 |
| 2010/0273899 A1 | * | 10/2010 | Winter .......................... 518/703 |
| 2010/0291167 A1 | * | 11/2010 | Iida et al. ...................... 424/401 |
| 2010/0317077 A1 | * | 12/2010 | Gaddy et al. .................. 435/161 |

OTHER PUBLICATIONS

International Search Report and Written Opinion for PCT/US2011/37358, dated Feb. 22, 2012, 9 pages.

\* cited by examiner

US 8,506,846 B2

CHAR SUPPORTED CATALYSTS FOR SYNGAS CLEANUP AND CONDITIONING

RELATED APPLICATIONS

The present application is a national stage application under 35 U.S.C. 371 of International Application No. PCT/US2011/037358, filed May 20, 2011, which claims the benefit of U.S. Provisional Patent Application No. 61/346,773, filed May 20, 2010, which is incorporated by reference herein in its entirety.

BACKGROUND OF THE INVENTION

1. Field of the Invention

The present invention is directed toward a catalyst that is particularly useful in reforming of tars present in syngas generated through biomass gasification. The catalyst comprises a physical mixture of particles of a catalytic material, such as NiO, and particles of a char. The char acts as a support for the catalytic material, but can also participate in the reforming process by providing a source of carbon.

2. Description of the Prior Art

Biomass gasification is considered a promising technology for production of sustainable fuels. Biomass gasification is a process in which biomass undergoes incomplete combustion to produce a gas product called syngas that comprises mainly of $H_2$, CO, $CH_4$, $CO_2$, and $N_2$ (if air is used in combustion) in various proportions. Biomass gasification has many advantages over direct combustion. It converts low-value feedstocks to high-quality combustible gases, which can be not only directly burned or used for electricity generation but also turned into liquid transportation fuels. However, tars are produced along with syngas during biomass gasification.

"Tar" is a generic term describing all organic compounds present in syngas except for the lighter gaseous hydrocarbons, such as methane. Tars can condense to more complex structures in pipes, filters, or heat exchangers of downstream equipment and processes, which may cause mechanical breakdown of the entire system. Tars may also deactivate catalysts in the refining process. Tar content varies from about 0.5 to 100 $g/m^3$ in biomass gasification syngas depending on the type and design of the gasifier, feedstock used, and operating conditions. Most applications of syngas require tar content below 50 $mg/m^3$; therefore, it is essential to reduce the level of tars to enable widespread utilization of syngas.

Several approaches for tar removal, such as physical treatment, thermal cracking, plasma-assisted cracking, and catalytic reforming, have been reported in the relevant technical literature. Among these, catalytic reforming is considered the most promising in large-scale applications because of its fast reaction rate and reliability and its ability to increase the quantity of useable gases such as CO and $H_2$ in syngas.

Various types of catalysts including calcined rocks, zeolites, iron ores, alkali metals, Ni-based catalysts, and precious metals have been studied for their usefulness in tar removal in biomass gasification. For catalytic reactivity and economic reasons, Ni-based catalysts are considered the most promising for tar removal and syngas reforming. Nickel catalysts can be usually supported by metal oxides (e.g., $Al_2O_3$ and MgO) or natural materials (e.g., dolomite and olivine). Some of these supports are expensive, and the catalyst preparation steps involve impregnation and calcination of the nickel onto the support, both of which are time and energy consuming. These factors limit extensive application of Ni-based catalysts for tar removal.

SUMMARY OF THE INVENTION

According to one embodiment of the present invention, there is provided a catalyst comprising a physical mixture of particles of a catalytic material and char.

According to another embodiment of the present invention, there is provided a method of removing tars from a syngas stream. The method comprises providing a catalyst that is a physical mixture of particles of a catalytic material and particles of char, and then contacting a syngas-containing stream having tars present therein with the catalyst under conditions for converting at least a portion of the tars into syngas components.

According to yet another embodiment of the present invention, there is provided a system for removing tars from a syngas stream. The system comprises a reactor vessel having a quantity of a catalyst disposed therein and a source of syngas operably connected with the reactor vessel. The catalyst comprises a physical mixture of particles of a catalytic material and particles of char, and the syngas includes tars therein.

According to still another embodiment of the present invention, there is provided a method of producing a catalyst. The method comprises the step of mechanically mixing particles of a catalytic material with particles of char. In particular embodiments, the method is a dry mixing operation and does not involve impregnation of the char with the catalytic material, nor does the method involve a calcination step.

BRIEF DESCRIPTION OF THE DRAWINGS

FIGS. 16e-f are EDX/SEM images of a nano-NiO/char catalyst;

DETAILED DESCRIPTION OF THE PREFERRED EMBODIMENT

Figure 1:
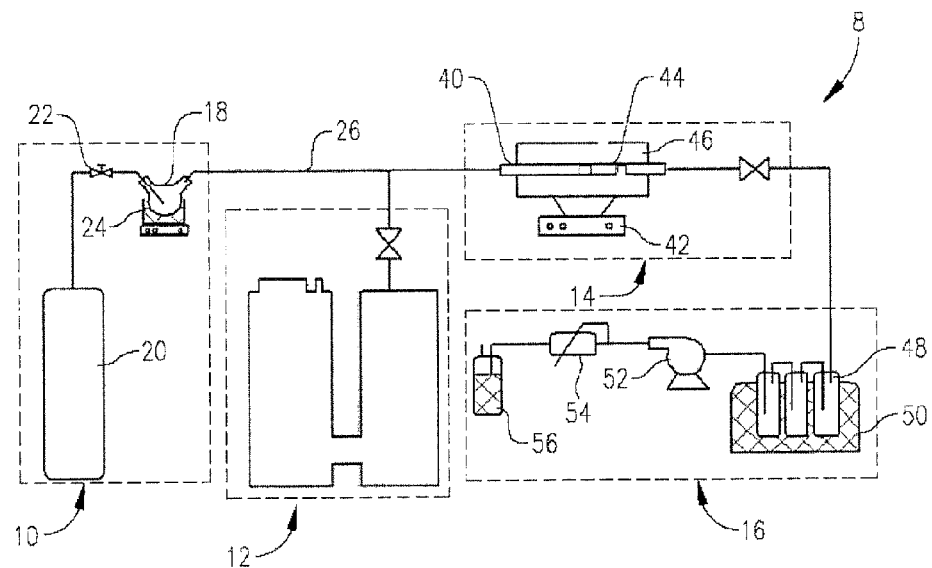
FIG. 1 is a schematic diagram of a tar removal testing apparatus.

Synthesis gas, or syngas as it is commonly referred to, is a mixture of gases derived from any number of processes that comprises at least carbon monoxide and hydrogen, and quite possibly a number of other components depending upon which mechanism is employed to generate the syngas. Syngas can be used in the manufacture of a number of materials such as ammonia, methanol, and various hydrocarbon products.

As discussed above, one process that is useful to produce syngas is biomass gasification. However, in addition to the highly desired syngas components carbon monoxide and hydrogen, biomass gasification can also produce a wide range of other, heavier organic components such as aromatic hydrocarbons, such as naphthalene and phenols, polycyclic aromatic hydrocarbons, and heterocyclic compounds, which are collectively referred to as tars. If left in the syngas, the tars can be harmful to equipment and cause fouling of catalysts employed in subsequent syngas reactions.

In addition to tars, syngas may also comprise other impurities such as $H_2S$, $NH_3$, and $CH_4$. Again, it is desirable to remove these impurities so as to avoid any adverse effects on downstream equipment and material.

One embodiment of the present invention is directed toward a catalyst that comprises a solid catalytic material physically mixed with char. In particular embodiments, the catalytic material comprises discrete particles that are intermixed with char particles. In still other embodiments, the catalytic material is deposited on the outer surface of the char particles, thus, the char particles serve as a support for the catalytic material particles. Note, the present physical mixture is contrasted with more traditional catalysts which are impregnated with a catalytic material. Impregnation generally requires dispersing a support material and/or a catalytic material precursor in a liquid medium so that the catalytic material can penetrate into the support material. The mixture must then be dried, and the process repeated if necessary. The resulting material may also need to be calcined in order to form the final catalyst. This process is quite time and energy consuming. This process also results in a fair amount of the catalytic material being dispersed within the pores of the support material, where the catalyst is less active. As discussed further below, catalysts according to certain embodiments of the present invention are prepared by mechanically mixing two solid materials together. This process is much faster and more energy efficient.

Catalysts made in accordance with the present invention comprise char as a support material that is intermixed with the catalytic material. Generally, char is the solid material that remains after light gases (e.g. coal gas) and tar (e.g. coal tar) have been driven-out or released from a carbonaceous material during the initial stage of combustion, which is known as carbonization, charring, devolatilization, or pyrolysis. The char can be derived from any number of sources and processes. Examples include coal char, biomass pyrolysis char, biomass gasification char, and biomass hydrothermal conversion (liquefaction) char. The chemical make up of the char is dependent upon the source for the char. In certain embodiments, the char comprises carbon as the predominant component in an amount of between about 65 to about 99%, or between about 70 to about 95%, or between about 75 to about 90% on an atomic basis. Generally, oxygen is the second most prevalent component in char, comprising between about 1 to about 30%, or between about 3 to about 25% or between about 5 to about 20% of the char on an atomic basis. Char may also include trace amounts (generally less than 1% on an atomic basis) of other element such as sodium, silicon, potassium, and calcium.

There are several advantages to using chars as the catalyst support. First, chars are less expensive than traditional metal oxide supports such as alumina. Second, less catalytic material can be used when creating a char-supported catalyst. The outer surfaces of catalysts of this type tend to comprise the catalysts's active sites, as opposed to the interior surfaces which are much less active. In catalysts formed according to the present invention, the catalytic material tends to stay primarily on the outer surface of the char support where it is most effective. In traditional metal-oxide-supported catalysts, however, the catalytic material is also formed inside the support via the impregnating and calcining methods. Thus, a fraction of catalytic material is not effective in the metal-oxide-supported catalyst. The present invention helps avoid this waste. Third, mechanical mixing of catalytic material and char saves energy and time in catalyst preparation.

In certain embodiments, the char support exhibits an average particle size of between about 1 μm to about 25 mm, or between about 50 μm to about 10 mm, or between about 100 μm to about 5 mm. In other embodiments, the char exhibits an average particle size of less than about 25 mm, or less than about 10 mm, or less than about 5 mm.

The catalytic material used in forming the catalyst is selected depending upon the desired application for the catalyst. In certain embodiments, the catalytic material comprises calcined rocks, zeolites, iron ores, alkali metals, and transition metals, especially precious metals. In still other embodiments, the catalytic material is selected from the group consisting of alkali and transition metal oxides, and particularly NiO. A plurality of catalytic materials can be employed in those applications where plural functionality of the catalyst is desired. In one particular embodiment in which the catalytic material is to be used in removal of tars from syngas, the catalytic material comprises NiO.

Generally, the catalytic material is present in the catalyst as discrete particles that are physically intermixed with discrete particles of the char support. The catalytic material particles are generally of a smaller size than the char particles, thus enabling the catalytic material to be "loaded" upon the char support. In certain embodiments, the catalytic material exhibits an average particle size of less than 1 mm, or less than 500 µm, or less than 100 µm. In particular embodiments, the catalytic material is nano-sized and exhibits an average particle diameter of between about 1 nm and about 500 nm, or between about 5 nm and about 100 nm, or between about 20 nm and 50 nm. In certain embodiments, the catalytic material is physically stabilized upon the outer surface of the char support so that it remains in contact therewith. In still other embodiments, the catalytic material is attracted to char support through various electrostatic forces, which create a loose attraction between the materials. The catalytic material generally is present in the catalyst in smaller amounts than the char. In certain embodiments, the catalytic material is present in the catalyst at a level of between about 0.01 to about 30% by weight, or between about 0.1 to about 25% by weight, or between about 1 to about 20% by weight. In other embodiments, the catalytic material comprises less than 20% by weight of the catalyst, or less than 15% by weight of the catalyst, or even less than 10% by weight of the catalyst.

As noted above, one advantage of the present catalysts is their ease of manufacture as compared to traditional catalysts that are manufactured via an impregnation and calcination process. Catalysts according to the present invention comprise simple physical mixtures of discrete particles of catalytic material and the char support. In certain embodiments, the physical mixtures are created through a mechanical mixing process wherein discrete particles of one component (such as the catalytic material) are introduced with discrete particles of another component (such as the char support). Any type of mechanical mixing device can be used to perform the mixing of the particles. In certain embodiments, the mixing together of the discrete particles of catalytic material and char occurs as a dry mixing operation. In still other embodiments, the manufacturing process for the catalyst does not involve impregnation of the catalytic material into the char support, nor does the process involve a calcination step.

Following the mixing step, the resulting catalyst material may be used immediately in the intended reaction process, or the catalyst can be further processed to improve it handling characteristics for a given application. For example, the catalyst can be made into pellets, having a self-sustaining or shape-retaining physical structure, or made into a fine powder. Catalyst pellets can have a pellet size of between about 5 mm to about 5 cm, or between about 10 mm to about 2.5 cm, or between about 15 mm to about 1.5 cm.

Catalysts made in accordance with the present invention can be used in a variety of applications such as syngas cleanup and conditioning (reforming); catalytic fuel synthesis, such as catalytic transformation of glycerol to synthesis gas, conversion of synthesis gas to mixed alcohols, and catalytic transformation of bio-oils to liquid fuels. The catalyst can be used to effectively remove tars, and also increase concentrations of CO and $H_2$ in syngas. Syngas reforming utilizing catalysts made in accordance with the present invention can be carried out at temperatures lower than would be required for traditional catalysts comprising NiO and alumina, and still achieve removal of at least 99% of all tars originally present. For example, syngas reforming with the catalytic materials described herein may be carried out at a temperature of between about 600 to about 900° C., or between about 700 to about 800° C. Further, the catalysts also exhibit excellent absorbing characteristics for facilitating removal of other impurities from syngas.

EXAMPLES

The following examples set forth exemplary catalysts and processes employing those catalysts according to the present invention. It is to be understood, however, that these examples are provided by way of illustration and nothing therein should be taken as a limitation upon the overall scope of the invention.

Example 1

Use of Biomass Hydrothermal Conversion (HTC) Char as Catalytic Material Support

In this example, the use of biomass hydrothermal conversion (HTC) char as a support for a Ni catalyst support was tested. Hydrothermal conversion is also called hydrothermal/direct liquefaction or hydrothermal upgrading/depolymerization. It is different from traditional pyrolysis in that the process is conducted in water under elevated pressure (7 to 30 MPa) but lower temperatures (280 to 380° C.). The primary product is an oily organic liquid, called bio-oil or bio-crude, and the main by-products are water containing soluble organic compounds and a solid residue, bio-char.

The objectives of this study were to examine the feasibility of using HTC char as the Ni support and determine appropriate parameters, including catalytic reaction temperature, gas residence time and Ni loading, for effective tar removal and syngas composition enhancement. The catalyst of Ni/char was made by mechanically mixing NiO particles with HTC char. The char-supported Ni catalysts were characterized and studied in a benzene-simulated tar-generation system and a laboratory-scale downdraft biomass gasifier. Activated-alumina-supported Ni catalysts were used as the baseline for comparison.

Char was made from HTC of corn cobs. The corn cobs were obtained from Kaytee Products Inc. (Chilton, Wis.). Before the experiments, corn cobs were dried at 49° C. overnight and ground in a Retsch SM2000 rotary cutting mill (Retsch Inc., Newtown, Pa.) with a 1.0-mm screen. A 1.8-L Parr Model 4578 high-temperature high-pressure reactor (Parr Instrument Company, Moline, Ill.) equipped with a magnetic stirrer, a serpentine cooling coil, a reflux/take-off condenser assembly, and a bottom drain valve was used for the reaction. Reaction conditions were set at 305° C., 20-min residence time, 20% biomass loading, and 2% NaOH as the catalyst.

The Ni/char catalyst was prepared by mechanically mixing char and NiO particles in a transparent glass beaker at desired ratios of NiO to char weight (5% to 20% at steps of 5%). The char particles were sieved to a size ranging from 1.4 to 2.0 mm. NiO powders were obtained from Fisher Scientific (Catalog #: 415581000, Pittsburgh, Pa.).

The baseline Ni/γ-$Al_2O_3$ catalysts were made by the impregnating method. Commercial γ-$Al_2O_3$ balls (Delta Adsorbents Company, Roselle, Ill.) with a diameter of ⅛ in. and surface area of 355 $m^2/g$ were used as the catalyst support. Ni(NO$_3$)$_2$.6H$_2$O (Fisher Scientific, Pittsburgh, Pa.) was used as the Ni precursor. To prepare 3% and 6% NiO loading catalysts via the single-step process, precisely weighed Ni(NO$_3$)$_2$.6H$_2$O was placed into a 100-ml beaker and dissolved into deionized water under vigorous stirring at room temperature. The homogeneous solution was then transferred into a 500-ml beaker containing precisely weighed alumina balls and stirred gently for 2 h to ensure complete impregnation of Ni(NO$_3$)$_2$.6H$_2$O into alumina. After that, the Ni/γ-Al$_2$O$_3$ spheres were dried in an oven at 75° C. for 12 h. Finally, the dried spheres were calcined in a tubular furnace at 400° C. for 4 h in the air. To prepare catalysts with greater than 6% Ni loadings, a two-step impregnation process was adopted. The procedure was the same as that for the single-step process except that only half the amount of Ni(NO$_3$)$_2$.6H$_2$O was used in the first step without calcination. Dried γ-Al$_2$O$_3$ spheres were then impregnated with the other half of the Ni(NO$_3$)$_2$.6H$_2$O solution, dried, and calcined in a tubular furnace at 400° C. for 4 h in the air. All catalysts were characterized using a HITACHI S-3500N scanning electron microscope (SEM; Hitachi, Ibaraki, Japan) through SEM/EDX (Energy Dispersive X-ray) measurements.

As shown in FIG. 1, the experimental system 8 was composed of four subsystems: a model tar generation unit 10, which provided constant flow of benzene as the model tar at a specific flow rate to the reforming unit; a biomass gasifier system 12; a tar/benzene reforming unit 14; and a tar/benzene collection unit 16.

Benzene was chosen as the model tar because of its chemical stability and easy condensability. In each experiment, 0.66 g benzene was placed into a 100-ml Knotes flask 18 with three angle necks. High-purity nitrogen flowed from a high-pressure cylinder 20 regulated by pressure regulator 22 (at an outlet pressure of 1 atm, flow rate of 3 L/min) into flask 18. Flask 18 was heated to 24±1° C. in a water bath 24, and all feeding lines 26 were wrapped with a heat insulation materials to prevent benzene from condensing before entering the reforming unit 14.

Figure 2:
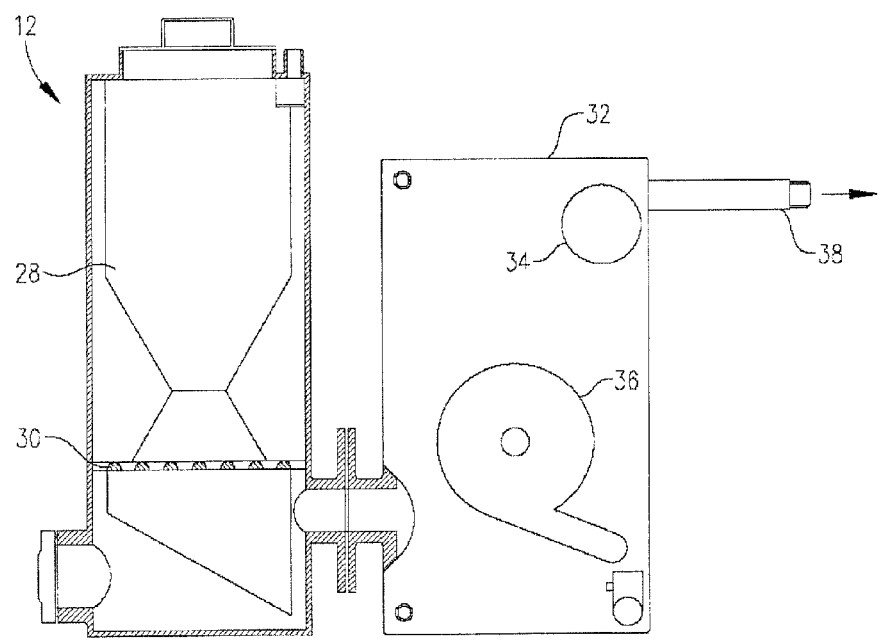
FIG. 2 is a schematic illustration of a laboratory-scale downdraft biomass gasifier system.

Gasification of wood chips was carried out in a laboratory-scale downdraft biomass gasifier system 12, which is schematically illustrated in FIG. 2. Gasifier system comprised a reaction chamber 28, a grate 30, a gas cooler 32, a filtration unit 34, and blower assembly 36. The gasifier system 12 had an overall syngas production rate of 2.8 to 5.6 cfm. An 80-W blower was used to suck air into the reaction chamber and provide stable flow to the outlet at a pressure of 1.2 kPa. Syngas flowed into the gas cooler 32, in which steam and a fraction of the tars condense and were collected. The filtrator 34 is filled with charcoal to remove particulate matters. In gasification tar reforming experiments, syngas from the outlet 38 was directly fed into the reforming tube 40 of reforming unit 14, and syngas flow rate was measured by a gas flow meter (Brooks Instrument, Hatfield, Pa.).

The tar reforming system 14 included a quartz, 1-in. diameter, 24-in. long reactor tube 40 with a complete vacuum-sealing assembly (MTI Corporation, Richmond, Calif.) and a Thermolyne Economy solid-tube furnace 42 (Fisher Scientific, Pittsburgh, Pa.). The furnace 42 was equipped with a single set-point temperature controller for up to a maximum working temperature of 1200° C. The catalyst bed 44 was placed in the center of tube 40 and horizontally supported by two alumina foam blocks 46 (MTI Corporation, Richmond, Calif.). In a typical experiment, the model tar or syngas flowed into tube 40 at one end, passed through the catalyst bed 44, and left at the other end. Residual tar was collected by the tar collection unit 16.

Table 1 shows the experimental parameters of benzene and tar reforming. In benzene reforming, temperatures were in the range of 700° C. to 900° C. at steps of 100° C. and Ni loadings ranged from 0% to 20% at steps of 5%. Gas residence times were set at 0.1, 0.2, 0.3, 0.6, 0.9 and 1.2 s. Results from benzene cracking were used to determine optimal conditions for tar reforming in biomass gasification, which were 800° C. reaction temperature, 15% Ni loading, and 0.3 s gas residence time. Because syngas flow rate was 5.1 L/min in the gasifier system, the catalyst bed was adjusted to 5.1 cm to achieve the gas residence time of 0.3 s.

TABLE 1

| Parameter | Model tar (benzene) reforming | Syngas tar reforming |
|---|---|---|
| Pressure (atm) | 1 | 1.012 |
| Temperature (° C.) | 700-900 | 800 |
| Initial tar concentration in the feeding gas (g/m$^3$) | 20 | 2.3 |
| Gas residence time (s) | 0.1-1.2 | 0.3 |
| Gas flow rate (l/min) | 3.0 | 5.1 |
| Catalyst bed length (cm) | 3 | 5.1 |
| Catalyst bed volume (cm$^3$) | 15.2 | 25.6 |
| NiO loading in catalysts | 0-20% | 15% |
| Benzene flow rate (g/min) | 0.066 | — |

The cold-trapping method was used for benzene/tar collection. The unit 16 was composed of three 250-ml flasks 48 dipped into an insulation box 50 filled with dry ice. Nitrogen-carried benzene or syngas-carried tars flowed into the three flasks 48 in series and were quenched and collected. The amount of benzene or tar collected was measured with a high-precision analytical balance (up to 0.1 mg). A few experiments were carried out in this study by passing a known amount (0.66 g) of benzene through the reforming furnace without catalyst bed for 10 min; this procedure revealed that 99.9% benzene was collected by the collection unit.

Syngas was collected from the sampling port or the outlet of the vacuum pump 52 with a 500-ml Tedlar sampling bag. Tar collection unit 16 further comprised a flow meter 54 and a residual tar recovery unit 56. Molar concentrations of H$_2$, N$_2$, CO$_2$, CO, and CH$_4$ were analyzed with a SRI 8610s gas chromatograph equipped with a thermal conductivity detector (SRI Instruments, Torrance, Calif.).

Figure 3A:
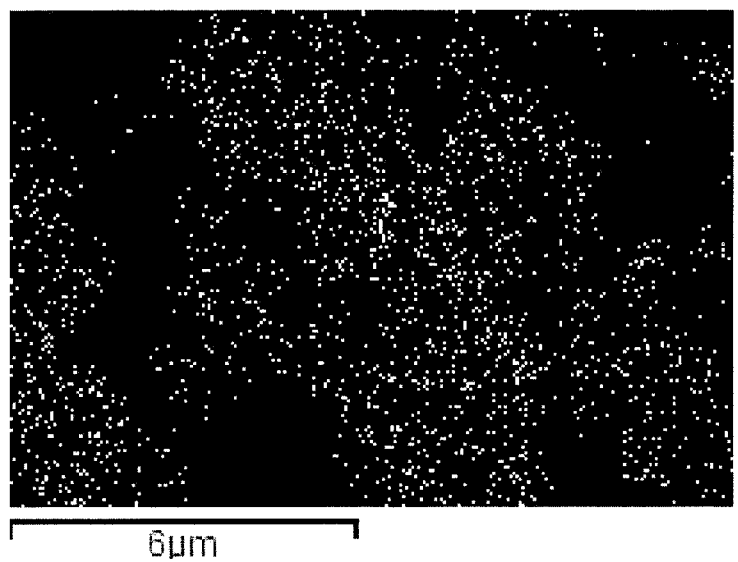
FIG. 3a is an EDX/SEM image showing the distribution of NiO particles on the surface of a $\gamma$-$Al_2O_3$ support.
Figure 3B:
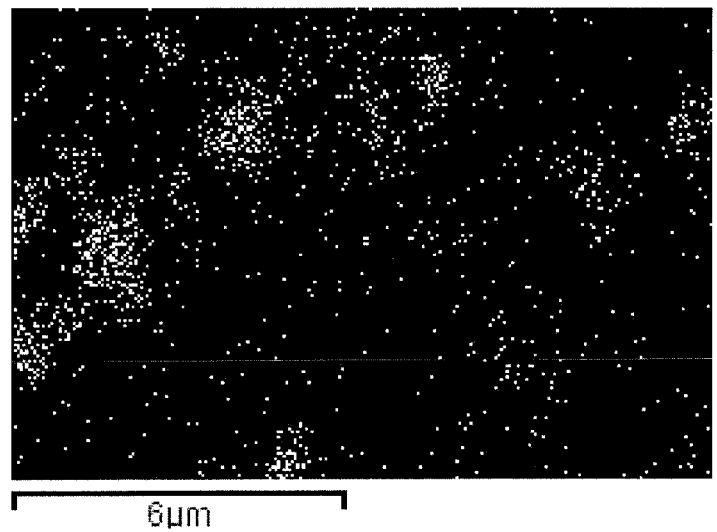
FIG. 3b is an EDX/SEM image showing the distribution of NiO particles on the surface of char made from HTC of corn cobs.

A SEM/EDX analysis was used to investigate morphology of the catalysts and distribution of NiO on the surface of the support. As can be seen in FIG. 3a, NiO particles (white dots, 15% loading) covered about 80% of the surface of the γ-Al$_2$O$_3$ support and were uniformly distributed. However, as shown in FIG. 3b, NiO particle distribution on the char support seemed less uniform than on the γ-Al$_2$O$_3$ support; NiO particles on the char support are also bigger than on the γ-Al$_2$O$_3$ support. This is mainly due to different catalyst preparation methods.

Figure 4B:
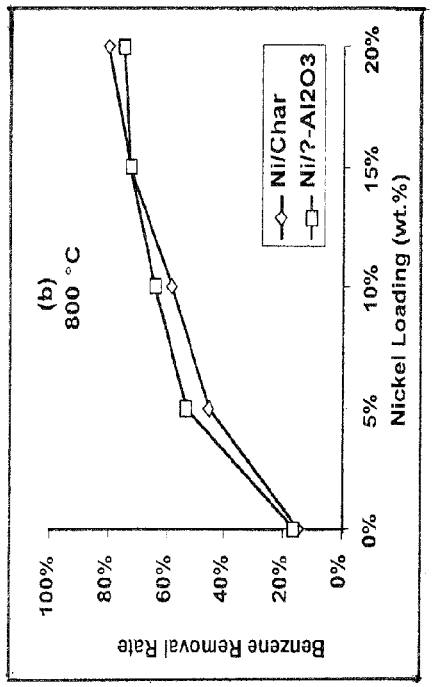
FIGS. 4a-c are graphs illustrating the effect of nickel loading on char and alumina catalysts on benzene removal at temperatures of 700° C., 800° C., and 900° C., respectively.
Figure 4A:
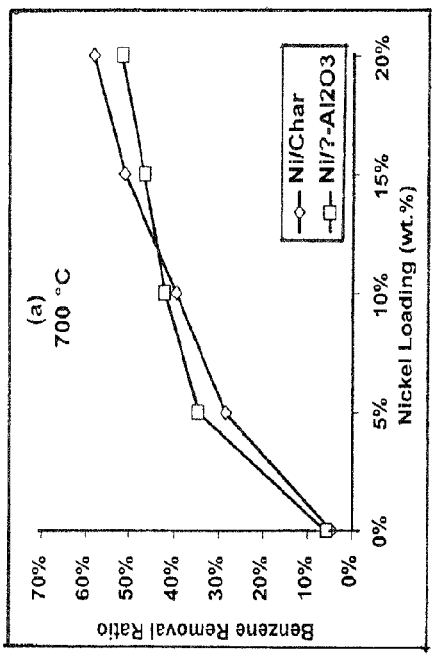
Figure 4C:
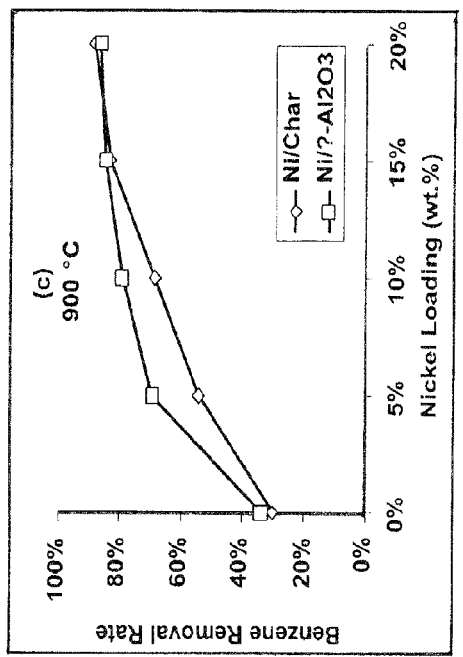

FIGS. 4a-c shows benzene removal rate as a function of Ni loading at different temperatures (gas residence time=0.3 s). Benzene removal rate increased with the increase of NiO loading at all temperatures tested for both catalysts. When NiO loading was above 15%, the increase in benzene removal rate slowed, which suggests that 15% could be an optimum loading.

Figure 5B:
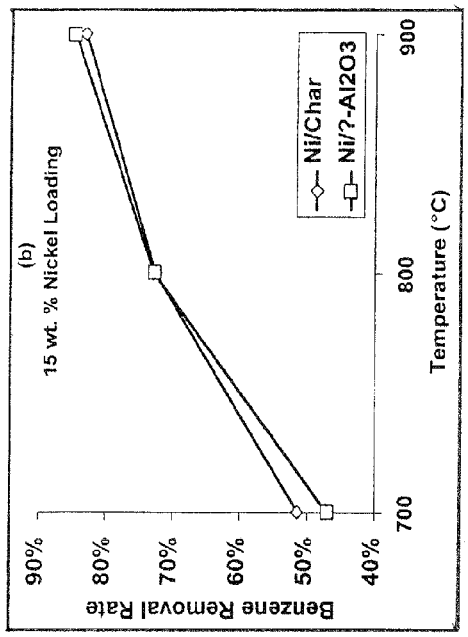
FIGS. 5a-c are graphs illustrating the effect of temperature on benzene removal for char and alumina-based catalysts at nickel loading levels of 10%, 15%, and 20%, respectively.
Figure 5A:
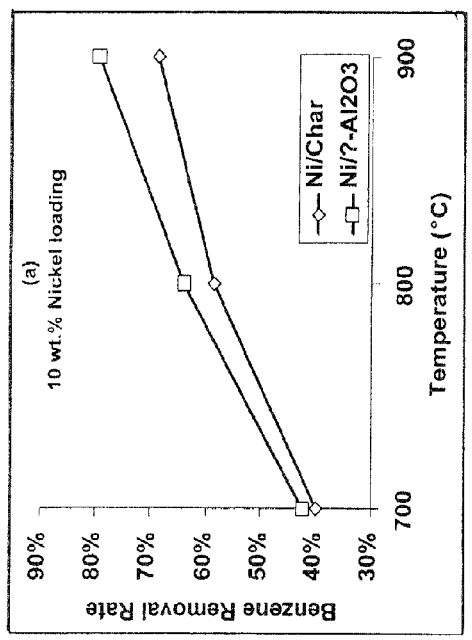
Figure 5C:
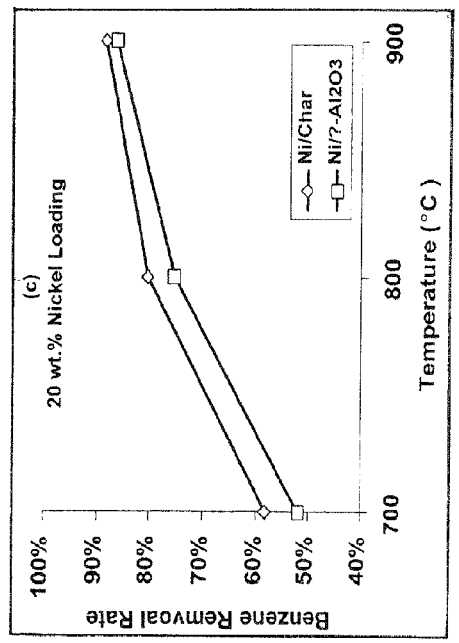

By presenting the same data shown in FIGS. 4a-c in a different way, FIGS. 5a-c indicate that benzene cracking performance of the Ni/γ-Al$_2$O$_3$ catalyst was slightly better than that of the Ni/char catalyst at all temperatures for NiO loadings below 15%. This was mainly due to the fact that density of the HTC char was about 50% of that of γ-Al$_2$O$_3$. This means with the same surface area, the Ni/char catalyst could have fewer NiO particles than the Ni/γ-Al$_2$O$_3$ catalyst. When NiO loadings were above 15%, the Ni/char catalyst showed slightly better performance in tar cracking, indicating that 15% or higher NiO loading is sufficient to cover the surface of HTC char particles to achieve a benzene removal rate similar to that of the Ni/γ-Al$_2$O$_3$ catalyst.

The effect of reaction temperature on benzene removal rate is also shown in FIG. 5 for the gas residence time of 0.3 s. As expected, reaction temperature played an important role in benzene reforming. Higher temperatures were desired; however, a temperature above 800° C. may not be necessary considering that overheating usually causes coke formation of the catalyst and consumes more energy.

Figure 6:
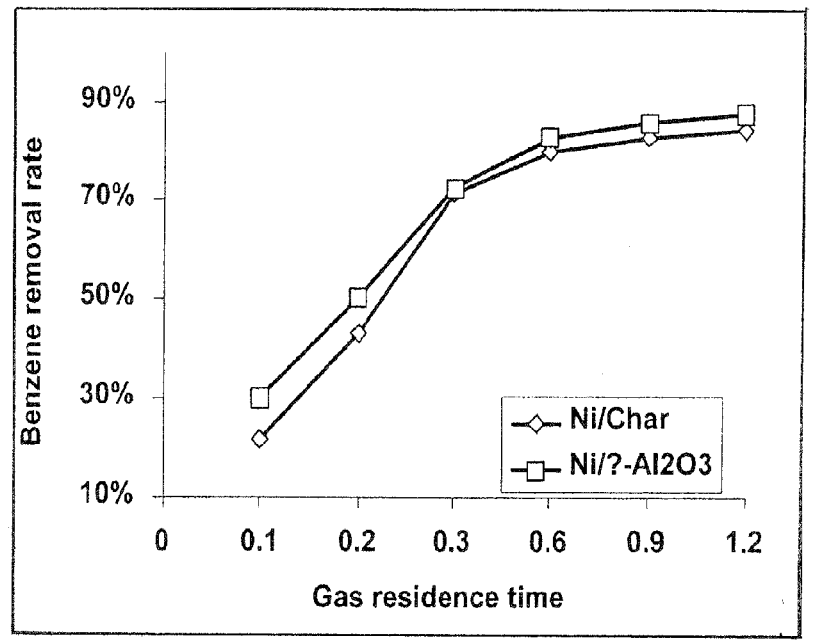
FIG. 6 is a graph illustrating the effect of gas residence time on benzene removal rate for char and alumina-based catalysts.

The effect of gas residence time on benzene removal was studied with both types of catalysts (15% Ni loading). Gas residence time refers to the length of time that the model tar resides in the catalyst bed. FIG. 6 shows benzene removal rate as a function of gas residence time. Benzene removal rate remained high when gas residence time was greater than 0.3 s but decreased significantly below 0.3 s. For a gas residence time of 0.1 s, only around 28% of benzene was cracked. This result indicates that benzene needs sufficient time to decompose even in the presence of Ni/γ-Al$_2$O$_3$ or Ni/char catalysts. When gas residence time increased to more than 0.3 s, the increase of benzene removal rate slowed gradually. Considering that longer gas residence times require slower syngas flow rates or the use of more catalysts, a minimal but reasonably effective time is desired. Therefore, 0.3 s was chosen as the optimum gas residence time to test catalyst performance in the removal of biomass gasification tars. Both Ni/char and Ni/γ-Al$_2$O$_3$ catalysts showed a similar trend in terms of gas residence time effect on benzene removal. Their performances were close at gas residence times greater than 0.3 s.

Tar removal performance of the catalysts at 800° C., 15 wt % NiO loading, and 0.3 s gas residence time was tested three times in a downdraft biomass gasifier. As shown in Table 2, more than 99% of tars were effectively removed with both catalysts. In addition to tar removal, combustible gases (H$_2$ and CO) in syngas also increased. Concentrations of H$_2$ in syngas increased 159% (from 19.96% to 51.78%) and 154% (from 20.43% to 51.90%) with the presence of Ni/γ-Al$_2$O$_3$ catalyst and Ni/char catalyst, respectively. Contents of CO in syngas also increased 29% to 30% in both cases. The results indicate that both Ni/γ-Al$_2$O$_3$ and Ni/char catalysts remarkably enhanced the cracking of tars in syngas and reformed tars and nonusable gases into combustible gases.

TABLE 2

| Catalyst | H$_2$ (vol. %) | CO$_2$ (vol. %) | CO (vol. %) | CH$_4$ (vol. %) | Tar Content (g/m$^3$) |
|---|---|---|---|---|---|
| Non-catalyst | 20.43 | 2.03 | 14.20 | 0.88 | 2.22 |
| Reformed with Ni/char | 51.90 | 0.33 | 18.36 | 0.19 | 0.0124 |
| Non-catalyst | 19.96 | 1.24 | 16.26 | 0.88 | 2.2548 |
| Reformed with Ni/γ-Al$_2$O$_3$ | 51.78 | 0.19 | 21.10 | 0.14 | 0.0127 |

In sum, the results showed that the Ni/char catalyst could remove more than 99% of tars in syngas at the optimum reforming conditions. Analysis of syngas compositions indicated that concentrations of H$_2$ and CO in syngas increased 154% and 29%, respectively, because of Ni/char catalytic reforming of tars. The Ni/char catalyst and Ni/γ-Al$_2$O$_3$ catalyst performed similarly in terms of tar removal and syngas reforming.

Example 2

Use of Char-Supported Ni Catalysts for Syngas Cleanup in an Updraft Biomass Gasifier In this example, Ni-based catalysts were made by mechanically mixing NiO and char particles at various ratios, and the catalytic performance thereof was studied and compared with performance of wood char and coal char without Ni for syngas cleanup in a laboratory-scale updraft biomass gasifier. Reforming parameters investigated were reaction temperature (650° C. to 850° C.), nickel loading (5% to 20% of the weight of char support), and gas residence time (0.1 to 1.2 s).

Four types of catalysts were prepared and studied: wood char, coal char, wood char with NiO (Ni/woodchar), and coal char with NiO (Ni/coalchar). The wood char and coal char were obtained from Royal Oak Enterprises, Inc. (Omaha, Ark.). Chars were crushed and sieved to obtain particles in the size range of 40 to 60 meshes (0.3 to 0.45 mm). Nickel oxide powders were purchased from Fisher Scientific (Pittsburgh, Pa.). The Ni/woodchar and Ni/coalchar catalysts were prepared by mechanically mixing char particles and NiO particles in a transparent glass beaker at desired ratios of NiO to char weight (5% to 20% at steps of 5%). All catalysts were characterized with a HITACHI S-3500N scanning electron microscope (SEM; Hitachi, Ibaraki, Japan) through SEM/EDX (energy dispersive X-ray) measurements.

Figure 7:
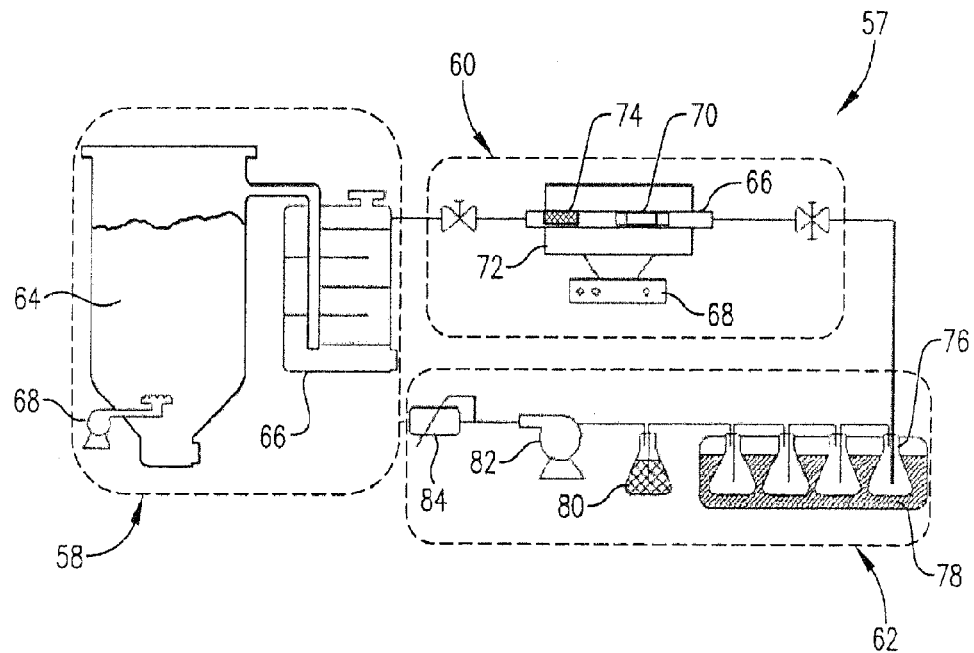
FIG. 7 is a schematic diagram of another tar removal testing apparatus.

As illustrated in FIG. 7, the experimental system 57 was composed of three subsystems: a biomass gasifier system 58, which provided a constant flow of raw syngas at a specific flow rate to the reforming unit via control of a flow control valve and vacuum pump; a tar reforming unit 60; and a tar collection unit 62.

Gasification of sawdust was carried out in a laboratory-scale updraft biomass gasifier system 58, which comprised a reaction chamber 64, a gas cooler 66, and blower assembly 68. The gasifier system 58 had an overall syngas production rate of 5-50 cfm depending on the voltage to the 15-W blower 68, which was used to blow air from the bottom of the gasifier into the reaction chamber 64. The raw syngas produced flowed into the gas cooler 66, in which steam and a fraction of tars were condensed and collected. In gasification tar reforming experiments, a small fraction of the syngas from the outlet on the top of the gas cooler 66 was directed to reforming unit 60, and syngas flow rate was measured with a gas flow meter (Brooks Instrument, Hatfield, Pa.). Average composition and tar content of the raw syngas of five replications from the updraft gasifier are presented in Table 3.

TABLE 3

| Contents of gaseous components of original syngas (vol %) | | | | | Tar content |
|---|---|---|---|---|---|
| N$_2$ | H$_2$ | CO | CO$_2$ | CH$_4$ | (g/m$^3$) |
| 49.71 | 23.97 | 22.95 | 1.06 | 2.32 | 8.55 |

The tar reforming system 60 included a quartz, 1-in.-diameter, 24-in.-long reactor tube 66 with a complete vacuum-sealing assembly (MTI Corporation, Richmond, Calif.) and a Thermolyne Economy solid-tube furnace 68 (Fisher Scientific, Pittsburgh, Pa.). The furnace 68 is equipped with a single set-point temperature controller for up to a maximum working temperature of 1200° C. The catalyst bed 70 was placed in the center of tube 66 and horizontally supported by two alumina foam blocks 72 (MTI Corporation, Richmond, Calif.). In a typical experiment, syngas flowed into the tube 66 at one end, passed through an alumina foam filter 74 and catalyst bed 70, and left at the other end. Residual tar was collected by the tar collection unit 62.

Table 4 shows the experimental parameters of tar reforming. Temperatures were in the range of 650° C. to 850° C. at steps of 50° C., and Ni loadings ranged from 0% to 20% at steps of 5%. Gas residence times were set at 0.1, 0.3, 0.6, 0.9 and 1.2 s by adjusting the syngas flow rate in the reforming tube through the flow control valve.

TABLE 4

| Condition | Parameter |
|---|---|
| Gasification agent | Air |
| Biomass feed | Sawdust |
| Catalytic bed temperature, ° C. | 650 to 850 |
| Gas residence time, s | 0.1 to 1.2 |
| Ni loading in catalysts | 0 to 20% |
| Gas flow rate, l/min | 9.12 |
| Reforming time, min | 15 |
| Char particle size, mesh (mm) | 40 to 60 (0.3 to 0.45 mm) |
| Catalyst bed length, cm | 9 |
| Amount of catalysts used, g | 18 |

The cold trapping method was used for tar collection. The tar sampling system was composed of four 250-mL flasks 76 dipped into an insulation box 78 filled with dry ice as shown in FIG. 7. Each sampling ran for at least 15 min to ensure that more than 100 liters of syngas flowed through the cold flasks. All tars and water vapor were collected in the flasks 76, which were then dried at 105° C. in an oven for 2 h. The residue was considered as tars. It is noted that only heavy tars (boiling point above 105° C.) were measured in this study considering that heavy tars are more damaging and difficult to remove than lights tars in catalytic cracking.

Syngas was flowed through a moisture absorbent 80 and collected from the sampling port or the outlet of a vacuum pump 82 with a 500-mL Tedlar sampling bag. Tar collection unit 62 further comprised a flow meter 84. Molar concentrations of $H_2$, $N_2$, $CO_2$, CO, and $CH_4$ were analyzed with an SRI 8610s gas chromatograph equipped with a thermal conductivity detector (SRI Instruments, Torrance, Calif.).

Figure 8A:
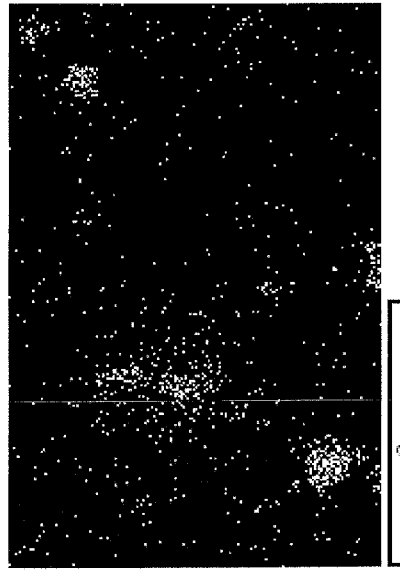
FIGS. 8a-b are EDX/SEM images showing the distribution of NiO on wood char and coal char, respectively.
Figure 8B:
Figure 8C:
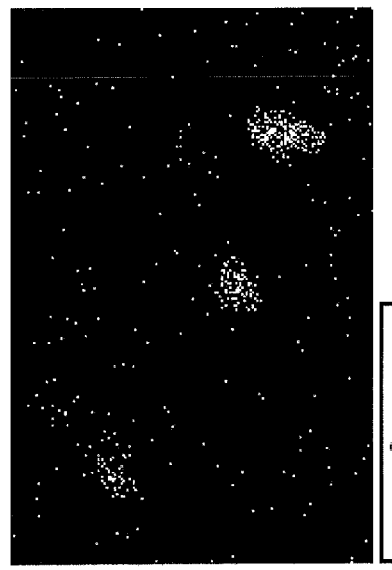
FIGS. 8c-d are EDX/SEM images showing the porous surface structure of wood char and coal char, respectively.
Figure 8D:
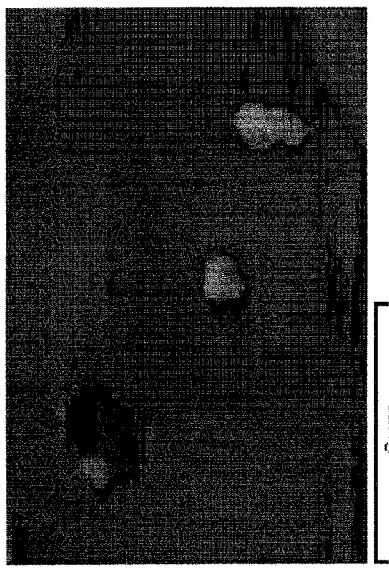

As shown in FIGS. 8a-b, Ni (bright dots and areas) was distributed more uniformly on the surface of the coal char support (FIG. 8b) than on the wood char support (FIG. 8a). This is mainly a result of the porous surface structure of the coal char (FIG. 8d), compared to wood char (FIG. 8c), which enhanced adsorption of NiO particles. The wood char used in this study had relatively smooth surfaces that did not adsorb NiO particles very well.

The elemental compositions of wood char and coal char used in the experiments were analyzed by SEM/EDX. Compared with wood char, coal char contained more O, Na, K, Ca, and Si (Table 5), which are helpful in tar removal.

TABLE 5

| Element | Wood char (atomic %) | Coal char (atomic %) |
|---|---|---|
| C | 91.53 | 79.06 |
| O | 8.03 | 19.58 |
| Na | — | 0.61 |
| Si | — | 0.08 |
| K | 0.06 | 0.09 |
| Ca | — | 0.56 |

Figure 9:
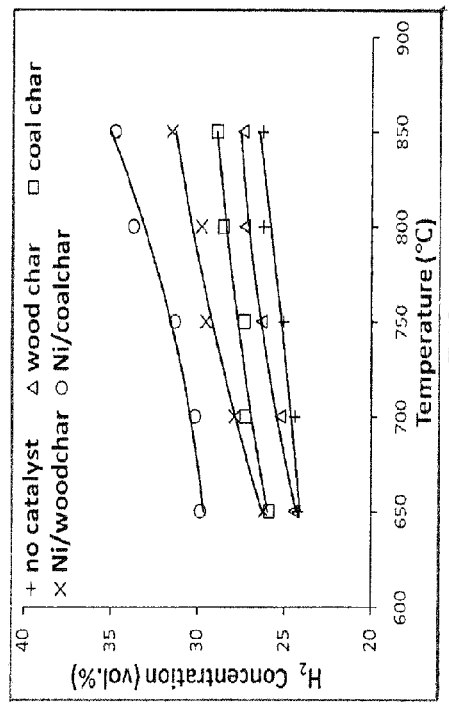
FIG. 9 is a graph illustrating the effect of temperature on tar removal rate for various wood and coal char catalysts.

The effect of reforming temperature in the range from 650° C. to 850° C. on tar removal and syngas composition was investigated while Ni loading and gas residence time were fixed at 15 wt % and 0.3 s, respectively. As shown in FIG. 9, tar removal rate increased with increasing reaction temperature in all cases. Under the same reaction conditions, the Ni/coalchar catalyst showed the highest tar removal rate (ranging from 91% to 99%). Ni/woodchar achieved a slightly lower tar removal rate (86% to 96%). Without Ni, coal char and wood char could also remove 75% to 90% tars depending on the temperature. This indicates that char alone is a reasonably effective catalyst for tar removal. However, real tars contain heavier and more complicated tars, such as asphaltum, than a model tar. Char alone may be an effective catalyst for light tar removal, but studies have shown that char lacks sufficient reactivity for heavy tars. Therefore, a Ni catalyst supported by coal char, such as that explored in this example, is a good catalyst design to take advantage of the high reactivity of NiO for heavy tar and effectiveness of char for light tar cracking in syngas cleaning.

Figure 10A:
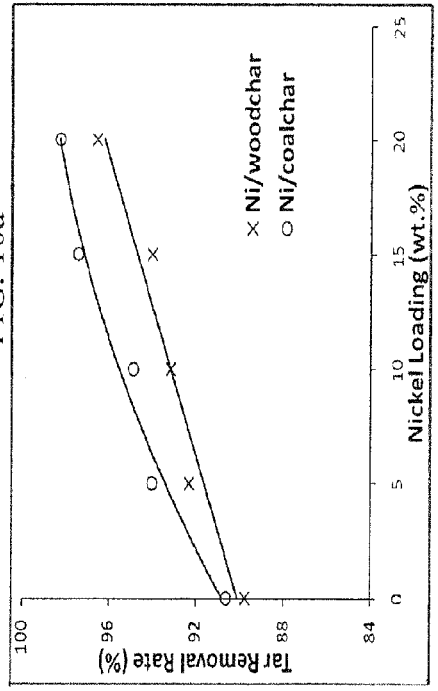
FIGS. 10a-b are graphs illustrating the effect of temperature on $H_2$ and CO levels during tar reforming utilizing various wood and coal char catalysts.
Figure 10B:
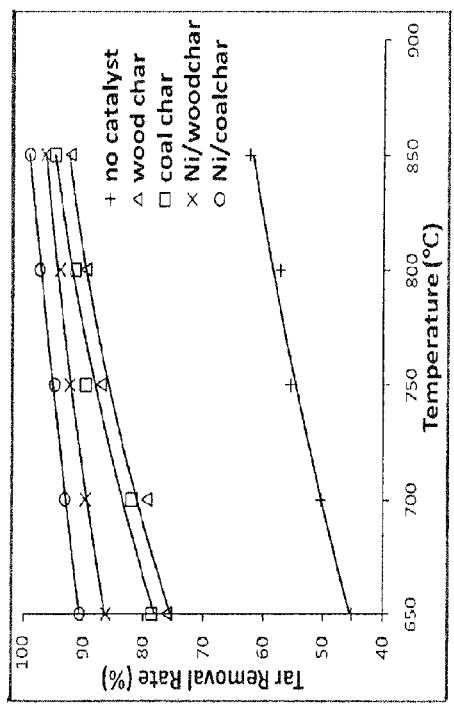

FIGS. 10a and 10b show concentrations of combustible gases as a function of reaction temperature for the four catalysts. Wood char and coal char slightly enhanced $H_2$ and CO production compared with no catalyst at all temperatures. Ni/coalchar and Ni/woodchar showed more increases in $H_2$ and CO, indicating that Ni is more effective than char only in reforming tars to generate CO and $H_2$. The following endothermic reactions convert light hydrocarbons, coke, and tars into $H_2$ and CO with the presence of Ni or char catalysts.

$$C_nH_m + nH_2O \rightarrow nCO + (n+m/2)H_2 \quad (1)$$

$$C_nH_m + nCO_2 \rightarrow m/2 H_2 + 2nCO \quad (2)$$

$$CH_4 + H_2O \leftrightarrow CO + 3H_2 \quad (3)$$

$$CO_2 + H_2 \leftrightarrow CO + H_2O \quad (4)$$

In addition to the above mechanisms, the following reactions may also take place when chars are used as the catalyst support. These reactions may explain the increasing trend of CO vs. temperature because more CO than $H_2$ is produced.

$$C + H_2O \leftrightarrow CO + H_2 \quad (5)$$

$$C + CO_2 \leftrightarrow 2CO \quad (6)$$

As expected, $H_2$ and CO concentrations increased with increasing temperature because of higher reactivity of Ni and char at higher temperatures. However, a temperature above 800° C. may not be worthwhile considering that overheating usually causes coke formation of the catalyst and consumes more energy. For this reason, 800° C. was considered the optimum temperature for tar removal in this study.

Figure 11:
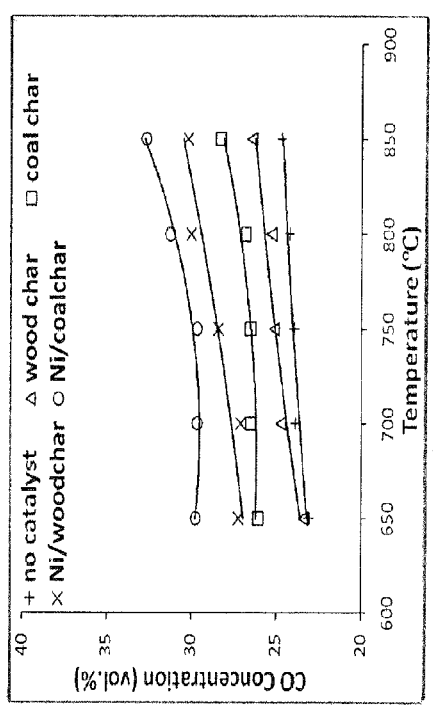
FIG. 11 is a graph illustrating the effect of nickel loading on tar removal rate for Ni/wood char and Ni/coal char catalysts.

The effect of Ni loading on tar removal and syngas reforming was studied with Ni/woodchar and Ni/coalchar catalysts at 0.3 s gas residence time and 800° C. reaction temperature. As shown in FIG. 11, tar removal rate steadily increased with increasing Ni loading, indicating that Ni plays a significant role in tar removal. The Ni/coalchar catalyst showed better performance than the Ni/woodchar catalyst at all Ni loadings because of the better adsorption and more uniform distribution of NiO particles on coal char particles as described above. A rapid increase of tar removal was observed from 10% to 20% Ni loading on wood char, indicating that wood char needs higher loadings of NiO because of poor adsorption of NiO particles on the char surface. It is believed that better mixing of NiO and wood char particles and the improvement of adsprotion and porosity of wood char would provide results closer tho the NI/coal char catalyst.

Figure 12B:
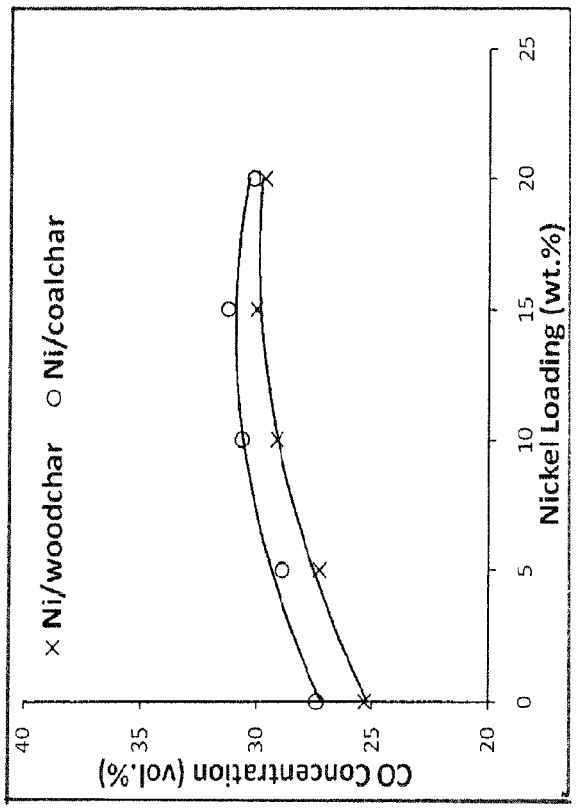
FIGS. 12a-b are graphs illustrating the effect of nickel loading on $H_2$ and CO levels during tar reforming utilizing Ni/wood char and Ni/coal char catalysts.
Figure 12A:
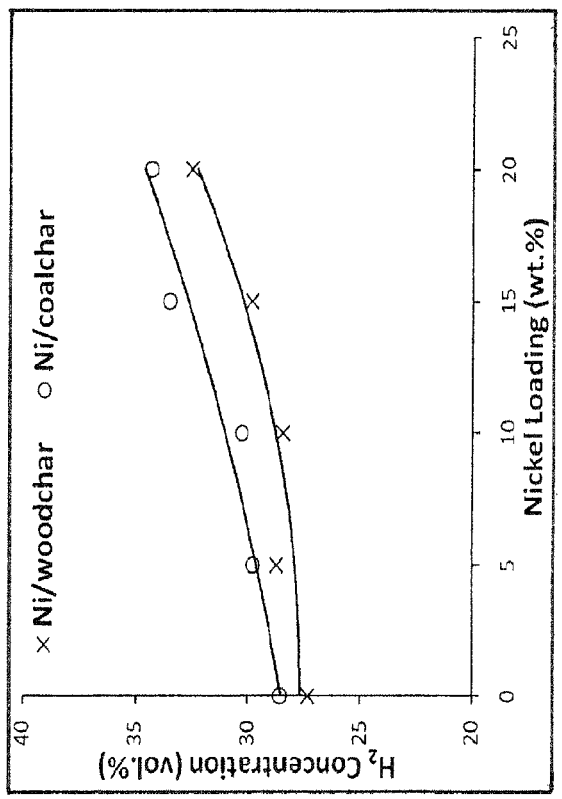

The effect of Ni loading on syngas composition is shown FIGS. 12a and 12b. With the increase of Ni content from 0% to 20%, $H_2$ concentration significantly increased from 27.33 to 32.53 vol % for Ni/woodchar and from 28.57 to 34.33 vol % for Ni/coalchar, which again suggests that it is mainly NiO that enhanced $H_2$ generation. CO concentration increased only slightly with increasing Ni loading and peaked at 15% Ni loading for both catalysts. When Ni loading further increased from 15% to 20%, CO concentration dropped slightly. These indicate that there is a competition between Ni and char in tar cracking. When Ni is dominant (e.g., at higher Ni loadings or better distribution of Ni on the support surface), more $H_2$ is generated. On the other hand, more CO is produced if syngas is more exposed to chars than to Ni. Therefore, it was observed that too much Ni on char can deteriorate the performance of the catalyst and that 15% could be an optimum Ni loading for the char supports used in this example.

Figure 13:
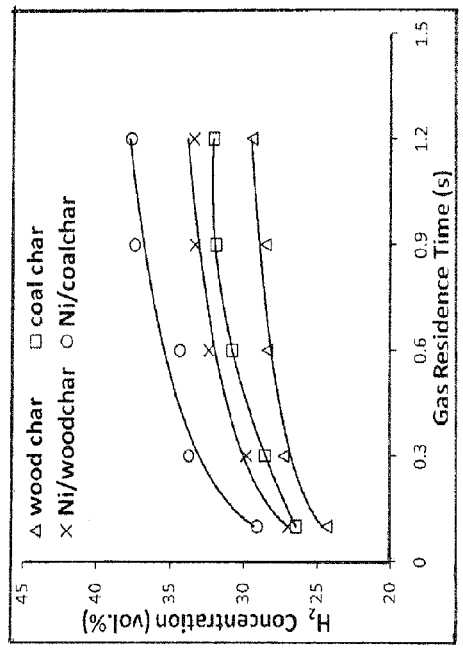
FIG. 13 is a graph illustrating the effect of gas residence time on tar removal rate utilizing various wood and coal char catalysts.

FIG. 13 shows tar removal rate as a function of gas residence time. Tar removal rate remained high when gas residence time was greater than 0.3 s but decreased significantly below that point. This result indicates that tars need sufficient time ($\geqq 0.3$ s) to decompose, even in the presence of the Ni/coalchar catalyst. When gas residence time increased beyond 0.3 s, the increase of tar removal rate slowed gradually. Longer gas residence times require use of more catalysts or lower syngas flow rates, so a minimal but reasonably effective time is desired. Therefore, 0.3 s was chosen as the optimum gas residence time to test catalyst performance in other experiments. It is also evident that Ni/coalchar had the best tar removal performance among all catalysts at all gas residence times tested.

Figure 14A:
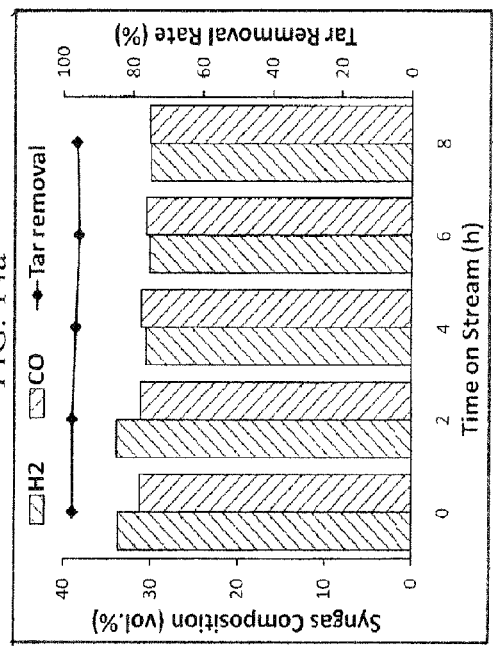
FIGS. 14a-b are graphs illustrating the effect of gas residence time on $H_2$ and CO levels during tar reforming utilizing wood and coal char catalysts.
Figure 14B:
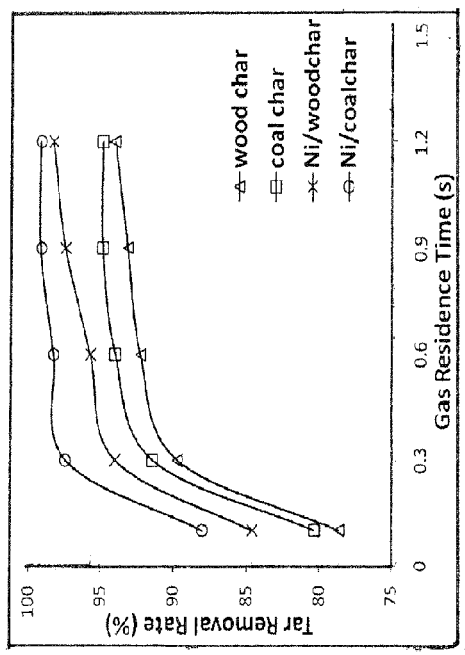

FIGS. 14a and 14b show the change of $H_2$ and CO concentrations at various gas residence times. $H_2$ concentration increased sharply when gas residence time increased from 0.1 s to 0.3 s. After 0.3 s, the increase of $H_2$ concentration slowed, similar to the trend of tar removal rate. CO concentration also increased with increasing gas residence time and peaked at 0.9 s for the Ni catalysts. Because tar removal is the main purpose of catalytic reforming, and longer gas residence times require slower syngas flow rates or the use of more catalysts, a minimal but reasonably effective time, such as 0.3 s, is desired.

Figure 15:
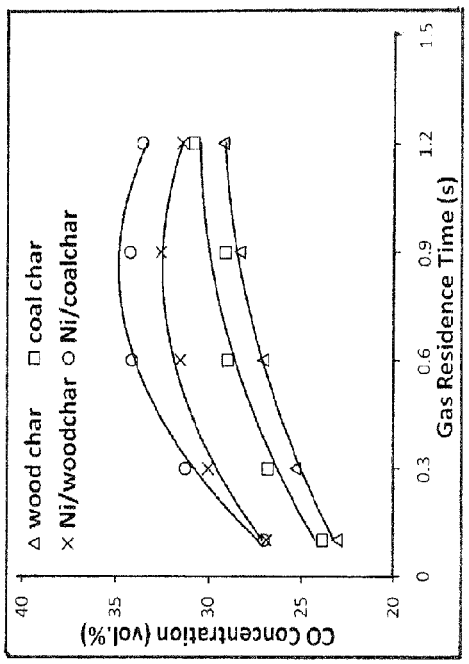
FIG. 15 is a graph illustrating the results of a catalyst stability and durability challenge conducted over an 8-hour period on a Ni/coal char catalyst.

Stability and durability of a catalyst are as important as its reactivity and selectivity. For this reason, the Ni/coalchar catalyst was tested continuously for 8 h in the updraft gasifier. FIG. 15 shows the change of tar removal rate and syngas composition over the testing time at 800° C., 15 wt % Ni loading, and 0.3 s gas residence time. The Ni/coalchar catalyst exhibited an excellent tar removal rate (>97%) in the first 2 h, and then the rate slightly decreased but remained stable and high after 2 h. CO and $H_2$ concentrations showed similar trends of a small reduction after 2 h and then stabilized. These phenomena indicate that slight deactivation of the catalyst happened in the early stage of tar/syngas reforming; however, the catalyst was able to stabilize soon after at optimum conditions (800° C. reaction temperature; 15% Ni loading, and 0.3 s gas residence time).

In sum, the Ni/coalchar and Ni/woodchar catalysts removed more than 97% of tars in syngas at the optimum reforming conditions. Analysis of syngas compositions indicated that concentrations of $H_2$ and CO in syngas significantly increased because of Ni/char catalytic cracking/reforming of tars. The catalytic performance of catalysts in this study can be ordered as Ni/coalchar>Ni/woodchar>coal char>wood char>no catalyst. Furthermore, performance of the Ni/coalchar catalyst was tested for 8 h. There was slight deactivation of the catalyst in the early stage of tar/syngas reforming; however, the catalyst was able to stabilize soon after at the optimum conditions.

Example 3

Use of Nano-Sized Ni on Char Support

In this example, the effect of using a nano-sized Ni catalytic material on a char support for biomass gasification tar removal was examined. The objectives of this study were to examine the feasibility of using coal char as the nano-Ni catalyst support while being a catalyst, and determine appropriate parameters, including catalytic reaction temperature, gas residence time and nano-Ni loading, for effective tar removal and syngas composition enhancement. The nano-Ni/char catalyst was tested in a laboratory-scale updraft biomass gasifier. Micro-sized NiO supported on coal char by mechanical mixing method and nano-sized NiO supported on $\gamma$-$Al_2O_3$ prepared by the impregnation and calcination method were also studied for comparison.

The coal char used in this study was obtained from Royal Oak Enterprises, Inc. (Omaha, Ark.). Char granules were crushed and sieved to obtain particles in the size range of 40 to 60 mesh (0.3 to 0.45 mm). Nickel and nano-Ni catalysts were obtained from Fisher Scientific (Pittsburgh, Pa.). The size of nano-Ni catalyt was approximately 30 nm. Ni/char and nano-Ni/char catalysts were prepared by mechanically mixing char and NiO particles in a transparent glass beaker at desired ratios of NiO to char weight (5% to 20% at steps of 5%). Commercial $\gamma$-$Al_2O_3$ balls (Delta Adsorbents Company, Roselle, Ill.) with a diameter of ⅛ inch and surface area of 355 $m^2/g$ were used as the catalyst support. $Ni(NO_3)_2 \cdot 6H_2O$ (Fisher Scientific, Pittsburgh, Pa.) was used as the Ni precursor. To prepare 5% Ni loading catalysts using the single-step process, precisely weighed $Ni(NO_3)_2 \cdot 6H_2O$ was placed into a 100-ml beaker and dissolved into deionized water under vigorous stirring at room temperature. The homogeneous solution was then transferred to a 500-ml beaker containing precisely weighed alumina spheres and stirred gently for 2 h to ensure complete impregnation of $Ni(NO_3)_2 \cdot 6H_2O$ into alumina. After that, the Ni/$\gamma$-$Al_2O_3$ spheres were dried in an oven at 75° C. for 12 h. Finally, the dried spheres were calcined in a tubular furnace at 400° C. for 4 h in the air. To prepare catalysts with higher than 5% Ni loadings, a two-step impregnation process was adopted. The procedure was exactly the same as the single-step process except that only half as much $Ni(NO_3)_2 \cdot 6H_2O$ was used in the first step without calcination. Dried $\gamma$-$Al_2O_3$ spheres were then impregnated with the other half of the $Ni(NO_3)_2 \cdot 6H_2O$ solution, dried, and calcined in a tube furnace at 400° C. for 4 h in the air. All catalysts were characterized using a HITACHI S-3500N scanning electron microscope (SEM; Hitachi, Ibaraki, Japan) through SEM/EDX (Energy Dispersive X-ray) measurements.

The experimental system used in this example was the same as shown in FIG. 7, discussed above. Gasification of saw dust was carried out as described in Example 2 and the average composition and tar content of the raw syngas from five replications of the updraft gasifier are presented in Table 6.

TABLE 6

| Contents of gaseous components of original syngas (vol. %) | | | | | Tar Content |
|---|---|---|---|---|---|
| $N_2$ | $H_2$ | CO | $CO_2$ | $CH_4$ | (g/m³) |
| 49.71 | 23.97 | 22.95 | 1.06 | 2.32 | 8.55 |

Tar reforming was performed using the experimental parameters identified in Table 7. In a typical experiment, temperatures were in the range of 650° C. to 850° C. at steps of 50° C. and Ni loadings ranged from 0% to 20% at steps of 5%. Gas residence times were set at 0.1, 0.3, 0.6, 0.9 and 1.2 s by adjusting the syngas flow rate in the reforming tube through the flow control valve.

TABLE 7

| Condition | Parameter |
|---|---|
| Gasification agent | Air |
| Biomass feed | Sawdust |
| Catalytic bed temperature, ° C. | 650 to 850 |
| Gas residence time, s | 0.1 to 1.2 |
| Ni loading in catalysts | 0 to 20% |
| Gas flow rate, l/min | 9.12 |
| Run time per sample, min | 15 |
| Char particle size, mesh (mm) | 40 to 60 (0.45 mm to 0.3 mm) |
| Catalyst bed length, cm | 9 |
| Amount of catalysts used, g | 18 |

Tars were removed and the syngas was analyzed as discussed in Example 2. Molar concentrations of $H_2$, $N_2$, $CO_2$, CO and $CH_4$ were analyzed by a SRI 8610s gas chromatograph equipped with a thermal conductivity detector (SRI Instruments, Torrance, Calif.).

Figure 16A:
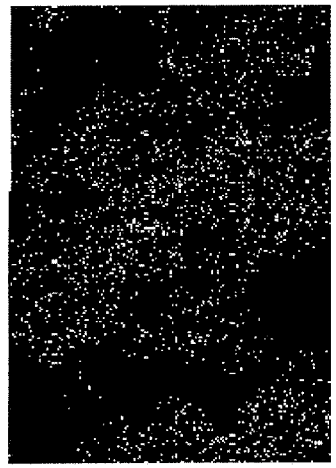
FIGS. 16a-b are EDX/SEM images of a NiO/char catalyst.
Figure 16C:
FIGS. 16c-d are EDX/SEM images of a NiO/γ-$Al_2O_3$ catalyst.
Figure 16B:
Figure 16E:
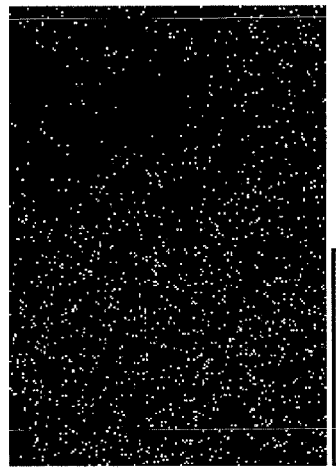
Figure 16A:
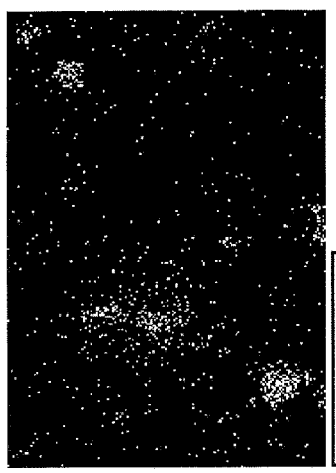
Figure 16D:
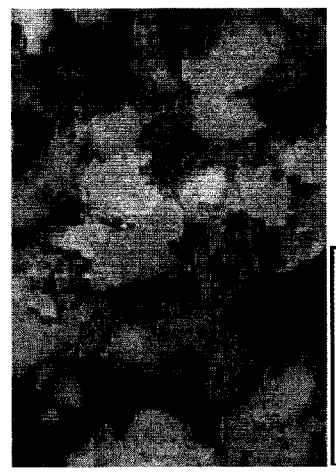

SEM/EDX (HITACHI S-3500N, Hitachi, Ibaraki, Japan) was used to investigate the morphology of the catalysts and the distribution of NiO on the surface of the support. Chars used in this example contained the atom ratio of C, 79.06%, O: 19.58%, Na: 0.61%, Si: 0.08%, K: 0.09%, and Ca: 0.56% through energy dispersive X-ray detector analysis from SEM (FIGS. 16a-f). As shown in FIG. 16e, nano-Ni particles (white dots or areas) distributed at the surface of the char uniformly, even more so that Ni/γ-$Al_2O_3$ catalyst prepared by impregnation. However, NiO particle distribution on the char support (FIG. 16a) seemed less uniform than nano-Ni particles on the support, indicating that nano-sized particles are easier to distribute on the support uniformly.

Figure 17:
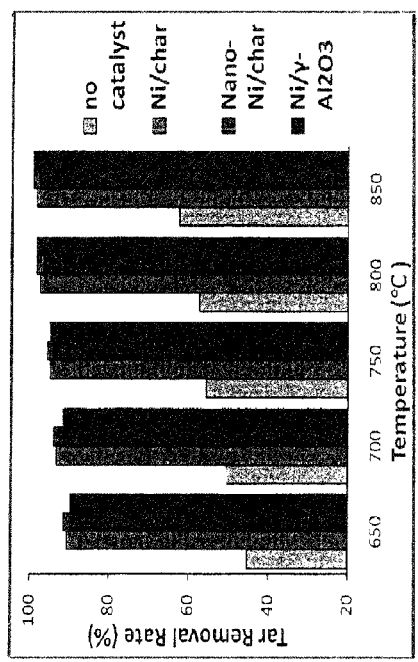
FIG. 17 is a graph illustrating the effect of temperature on tar removal rate during tar reforming using char and alumina-based catalysts.

The effect of reforming temperature on tar removal and syngas composition were investigated for the temperature range of 650° C. to 850° C. while the Ni loading and gas residence time were fixed at 15 wt % and 0.3 s, respectively. As shown in FIG. 17, tar removal rate increased with increasing reaction temperature in all cases. Under the same reaction conditions, nano-Ni/char catalyst showed the highest tar removal at all temperatures, ranging from 91% to 99%. Ni/γ-$Al_2O_3$ exhibited 89% tar removal rate at relatively low temperature (~650° C.), which was less than Ni/char or nano-Ni/char. Tar removal rate of Ni/γ-$Al_2O_3$ increased rapidly with increasing temperature. This indicated that higher reaction temperature (over 700° C.) was essential for tar removal by Ni/γ-$Al_2O_3$ catalyst. In contrast, nano-Ni/char showed higher activity at 650° C.

Figure 18A:
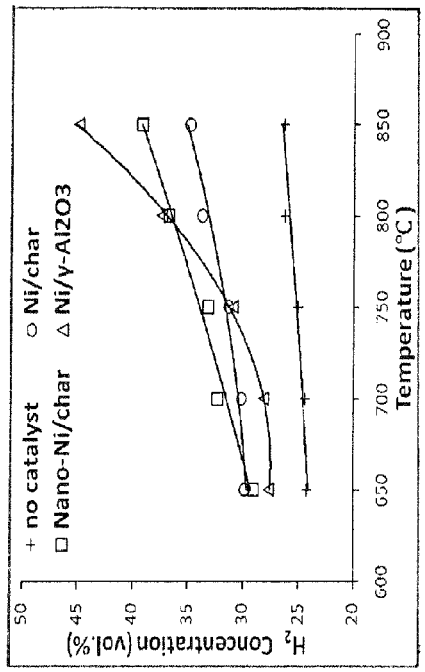
FIGS. 18a-c are graphs illustrating the effect of temperature on $H_2$, CO, and $CH_4$ concentration during tar reforming using char and alumina-based catalysts.
Figure 18C:
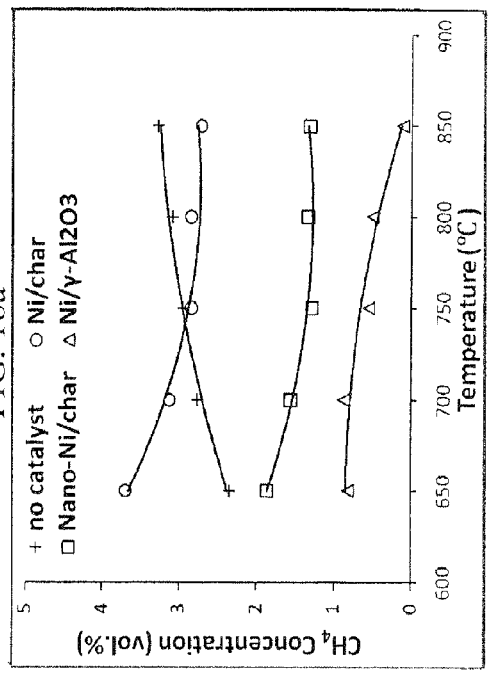
Figure 18B:
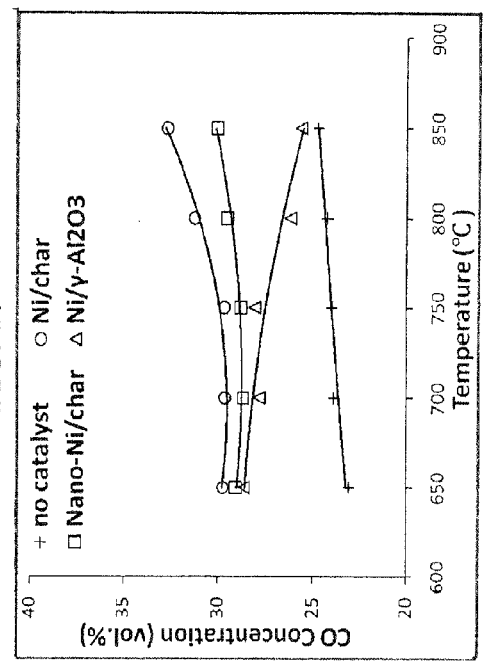

FIGS. 18a-c show $H_2$, CO and $CH_4$ concentration as a function of reaction temperature using Ni/Char, Nano-Ni/char, Ni/γ-$Al_2O_3$ and no catalyst system. As expected, $H_2$ concentration increased with increasing temperature for all the catalysts. $H_2$ concentration for Ni/char and Nano-Ni/char was increased with linear increment from 29.86 to 34.82 vol. % and from 29.04 to 39.17 vol. %, respectively. However, for Ni/γ-$Al_2O_3$ catalyst, $H_2$ concentration had a slow increase before 750° C., then increased rapidly from 30.90 to 44.94 vol. %. It could be explained that Ni/γ-$Al_2O_3$ catalyst strongly favored water gas shift reactions (WGS) ($CO+H_2O \leftrightarrow CO_2+H_2$) at relatively high temperatures to produce $H_2$. CO concentrations also went higher at higher temperatures for Ni/char catalyst, from 29.74 to 32.73 vol. %, and had a little increase from 29.07 to 30.06 vol. % for Nano-Ni/char catalyst. Due to the Ni/γ-$Al_2O_3$ catalyst favoring the WGS reactions at higher temperature, CO concentration decreased with increasing temperature. $CO_2$ concentration decreases to less than 0.10% for all the catalysts. Because the CO-shift reaction generates $CO_2$, the decrease of $CO_2$ concentration could be attributed to $CO_2$ reacting with tars and with small hydrocarbons by the dry reforming reactions. Thus, the removal of tar and small hydrocarbons with the catalysts were not only steam reforming reactions but dry reforming reactions.

$CH_4$ concentration decreased with increasing temperature for all catalysts. Also, it was observed that the catalytic performance of the nano-Ni/char catalyst closed in on the Ni/γ-$Al_2O_3$ catalyst, which illustrates better performance than Ni/char catalyst for the steam reforming of $CH_4$ ($CH_4+H_2O \leftrightarrow CO+3H_2$). It was also observed that the $CH_4$ concentration of Ni/char is even higher than no catalyst system at 650° C. This is due to the fact that char alone produces $CH_4$ through the shift reaction ($CO+3H_2 \leftrightarrow CH_4+H_2O$) at relatively low temperatures. With increasing temperature, nickel catalyst showed higher activity and favored the steam reforming of $CH_4$, thus $CH_4$ concentration decreased rapidly. This phenomenon suggested that the char takes part in the reactions, and the nano-sized nickel catalyst showed better catalytic activity than nickel catalyst supported by char due to greater $CH_4$ conversion.

Figure 19:
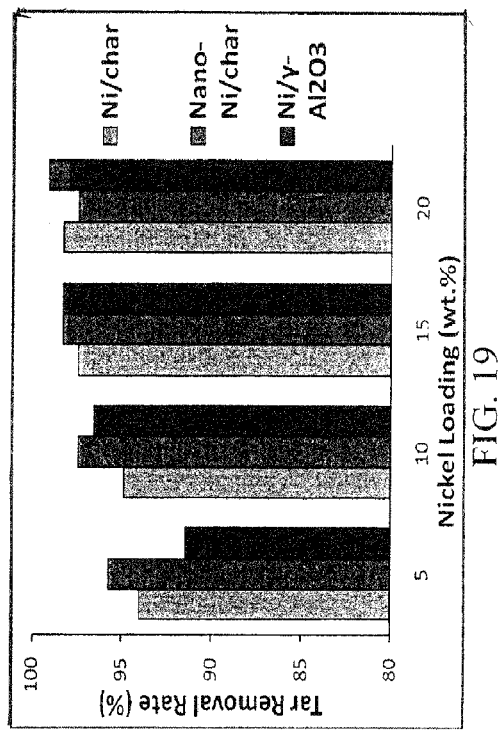
FIG. 19 is a graph illustrating the effect of nickel loading on tar removal rate during tar reforming using char and alumina-based catalysts.

The effect of Ni loading on tar removal and syngas reforming was studied with Ni/char, nano-Ni/char and Ni/γ-$Al_2O_3$ catalysts at 0.3 s gas residence time and 800° C. reaction temperature. As shown in FIG. 19, tar removal rate steadily increased with increasing Ni loading indicating that Ni plays a significant role in tar removal. The nano-Ni/char catalyst showed better performance than Ni/char and Ni/γ-$Al_2O_3$ catalyst when Ni loading increased from 5 to 15 wt. % due to better adsorption and more uniform distribution of NiO particle on char particles as described above. However, the performance of nano-Ni/char decreased when nickel loading further increased up to 20 wt. %. This indicates that more nickel particles are not helpful for increasing available contact surface. It was observed that for Ni/γ-$Al_2O_3$ with 5 wt. % nickel loading tar removal was significantly lower than Ni/char and nano-Ni/char. This can be explained because in γ-$Al_2O_3$ supported catalysts, NiO is also formed inside the support via the impregnating and calcining methods. NiO inside of the support is not active due to high syngas flow resistance, which leads to parts of nickel catalyst being wasted. Thus, nano-Ni/char saved much more nickel catalyst than Ni/γ-$Al_2O_3$.

Figure 20A:
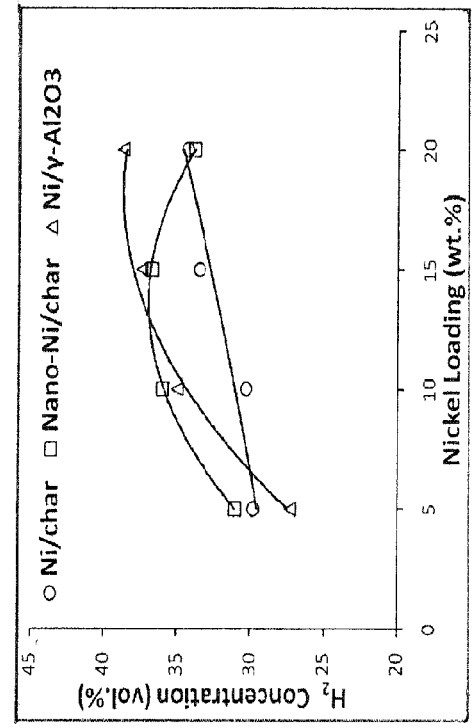
FIGS. 20a-c are graphs illustrating the effect of nickel loading on $H_2$, CO, and $CH_4$ concentration during tar reforming using char and alumina-based catalysts.
Figure 20C:
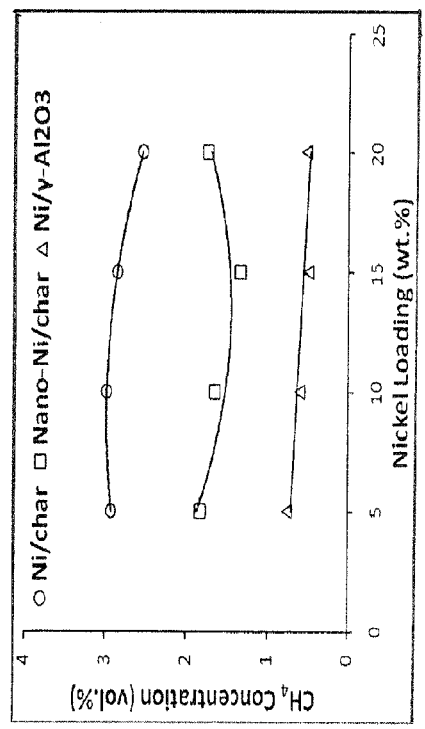
Figure 20B:
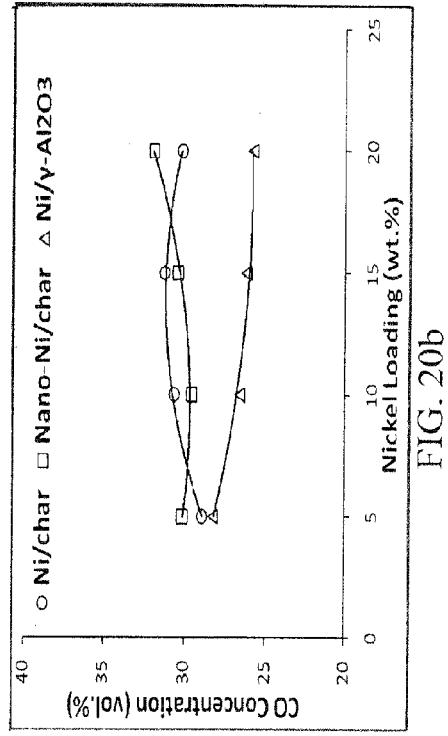

The effect of Ni loading on syngas composition is shown in FIGS. 20a-c. With the increase of nickel content from 5% to 20%, $H_2$ concentration significantly increased from 29.79 to 34.33 vol. % for Ni/char and from 27.29 to 38.70 vol. % for Ni/γ-$Al_2O_3$ catalyst, which suggests that it is mainly Ni that enhanced $H_2$ generation. $H_2$ concentration almost reached the highest value up to 37.39 vol. % for Ni/γ-$Al_2O_3$ with 15 wt % nickel loading, meanwhile, CO concentration significantly decreased with the increasing nickel loading. It again indicated nickel catalyst strongly favored WGS reactions as previously discussed. However, for the nano-Ni/char catalyst, $H_2$ concentration increased significantly from 31.03 to 36.73 vol. % when Ni loading increased from 5 to 15 wt. %, then decreased to 33.83 vol. % with Ni loading further increased to 20 wt. %. CO and $CH_4$ concentrations for Nano-Ni/char catalyst exhibited a similar trend, which kept stability up to 15 wt. % of nickel loading, then increased slightly. This indicated that nano-Ni catalyst lost part of its catalytic activity with nickel loading increasing. As expected, $CH_4$ concentration decreased with nickel loading increasing for all catalysts, which suggested Ni favored strongly $CH_4$ steam reforming reaction.

Figure 21:
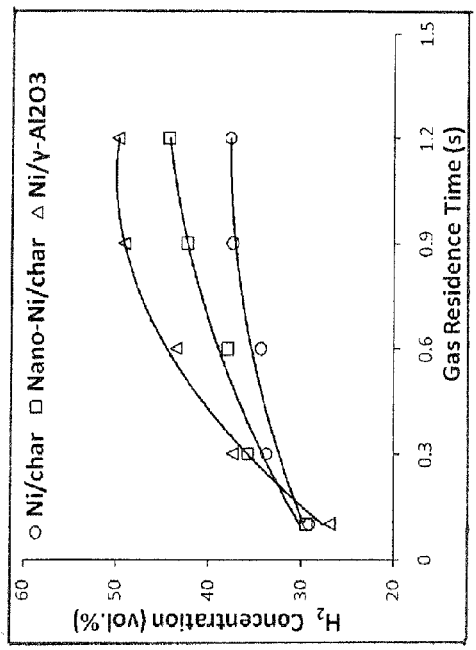
FIG. 21 is a graph illustrating the effect of gas residence time on tar removal rate during tar reforming using char and alumina-based catalysts.

FIG. 21 shows tar removal rate as a function of gas residence time. It can be seen that tar removal rate remained high when gas residence time was greater than 0.3 s, however, it decreased significantly below 0.3 s. This indicates that tar needs sufficient time ($\geqq 0.3$ s) to decompose. When gas residence time increased over 0.3 s, increase of tar removal rate slowed down gradually. It can be observed nano-Ni/char catalyst lead to higher tar removal rate than Ni/char and Ni/γ-$Al_2O_3$ catalyst at 0.1, 0.3 and 0.6 s gas residence time, which is attributable to the more uniform distribution of nanoparticles on the surface of char. After 0.9 gas residence time, all the catalysts reached the highest tar removal rate of 99%. Considering that longer gas residence times require the use of more catalysts or lower syngas flow rates, a minimal but reasonably effective time is desired. Therefore, 0.3 s was chosen as the optimum gas residence time to test catalyst performance.

Figure 22A:
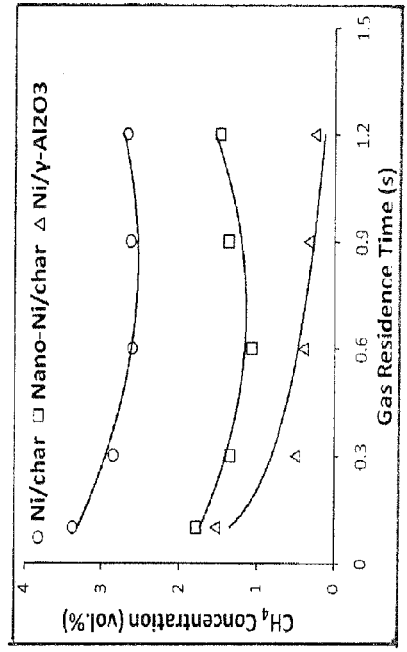
FIGS. 22a-c are graphs illustrating the effect of gas residence time on $H_2$, CO, and $CH_4$ concentration during tar reforming using char and alumina-based catalysts.
Figure 22B:
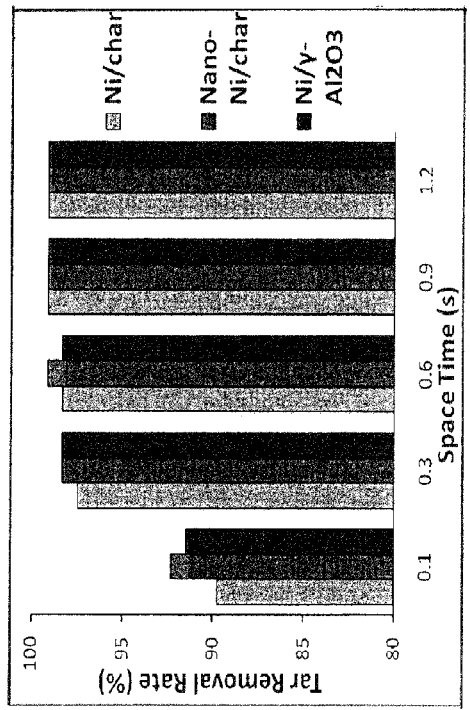
Figure 22C:
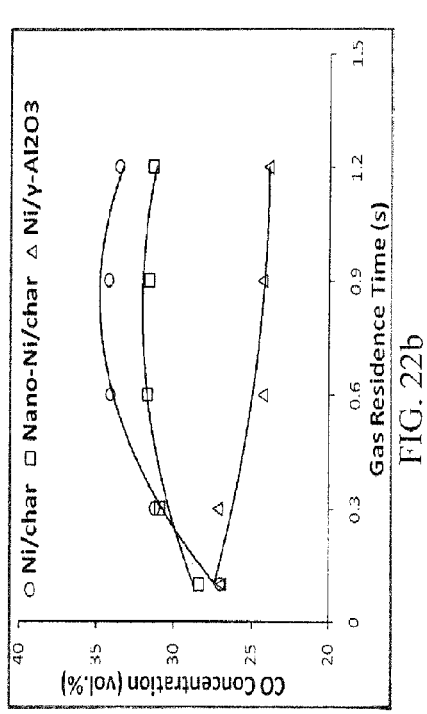

FIGS. 22a-c show the change of concentrations of $H_2$, CO and $CH_4$ at various gas residence times. It was found that $H_2$ concentration increased sharply when gas residence time increased from 0.1 s to 0.3 s. After 0.3 s, increase of $H_2$ concentration slowed down, similar to the trend of tar removal rate. $H_2$ concentration reached the highest value at 0.9 s gas residence time, 37.42 vol. % for Ni/char, 42.35 vol. % for nano-Ni/char and 49.23 vol. % for Ni/γ-$Al_2O_3$ catalyst. CO concentration also increased significantly for Ni/char and slightly increased for nano-Ni/char, but peaked at 0.9 s. All of the results suggest that a sufficient gas residence time is required to enable the catalytic reactions to reach equilibrium, but too long a gas residence time does not enhance combustible gas generation. One explanation of decreasing CO by Ni/char and nano-Ni/char catalyst when gas residence time was longer than 0.9 s for nickel catalysts might be that the pressure difference across the catalyst bed was smaller at longer residence times. The smaller pressure difference could reduce the contact area between syngas and the catalyst because gases flow through the pathways with lower resistances. It also means that less syngas/tars will flow through char at lower pressures, therefore, CO concentration tends to decrease at longer residence times (e.g., 1.2 s). Considering that longer gas residence times require slower syngas flow rates or the use of more catalysts, a minimal but reasonably effective time is desired. Therefore, 0.3 s was chosen as the optimum gas residence time for char-supported nano-Ni catalysts to remove biomass gasification tars.

Figure 23B:
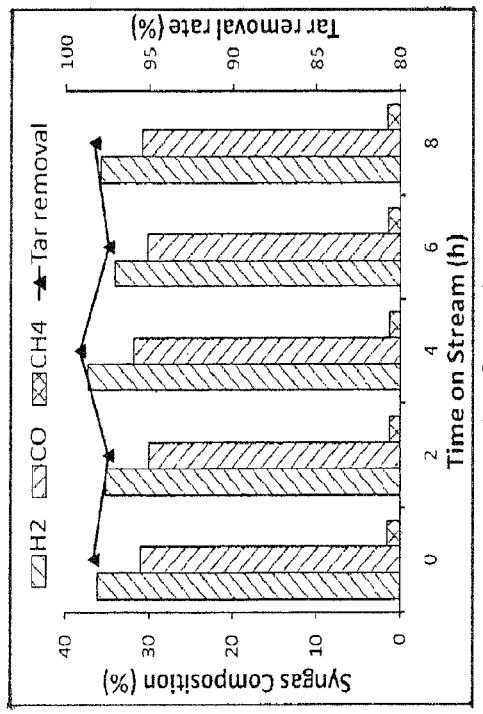
FIGS. 23a-c are graphs illustrating the results of a catalyst stability and durability challenge conducted over an 8-hour period on Ni/char, nano-Ni/char and Ni/γ-alumina catalysts, respectively.
Figure 23A:
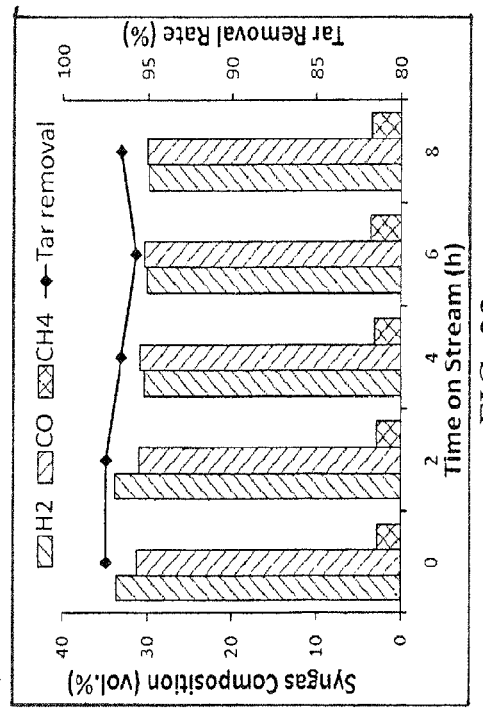
Figure 23C:
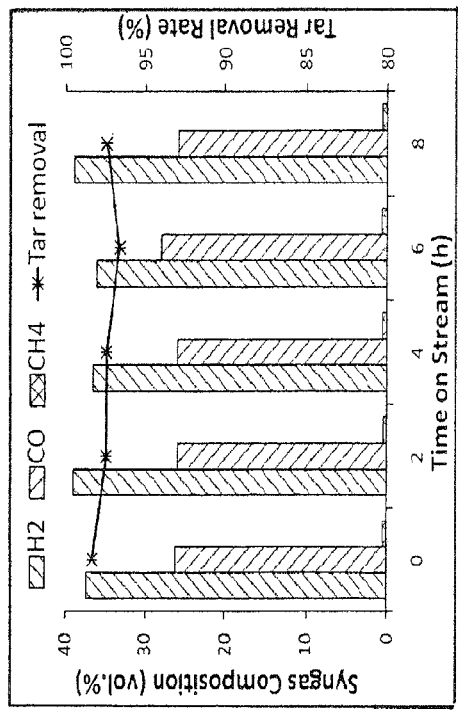

The stability and durability of a catalyst is as important as its reactivity and selectivity. For this reason, all the catalysts in this example were tested continuously for eight hours on the updraft gasifier. FIG. 23a-c shows the change of tar removal performance and syngas composition over testing time at 800° C., 15 wt % Ni loading and 0.3 s gas residence time. Ni/char and Ni/γ-$Al_2O_3$ catalyst exhibited good tar removal rate (>97%) in the first two hours, and then the rate slightly decreased but kept stable after two hours. CO and $H_2$ concentrations also showed similar trends of a small reduction after two hours and then stabilized. Nano-Ni/char catalyst basically kept stable in eight hours of performance tests.

The nano-Ni/char catalyst showed and exhibited higher catalytic performance than Ni/char catalyst. Although nano-Ni/char is not as good as Ni/γ-$Al_2O_3$ for favoring WGS reactions at a high temperature (over 750° C.), it showed higher catalytic performance than Ni/γ-$Al_2O_3$ at relatively low temperatures. Nano-Ni/char with 5% nickel content showed excellent catalytic performance, which was even better than Ni/char at 10% nickel content. This showed that nano-Ni/char reduces the requirement for catalytic material.

In sum, SEM/EDX analysis showed nano-Ni particles distributed at the surface of char uniformly, even better than Ni/γ-$Al_2O_3$ catalyst prepared by the impregnation method. Ni/char showed high catalytic performance on aspects of the tar removal and the quality improvement of the syngas composition even at a relatively low temperature of 650° C. Nano-Ni/char showed high catalytic performance across the whole range of test temperatures. Furthermore, with increasing reaction time, the activity of the catalyst was stable in 8 h tests. Using nanosized nickel as catalyst can also reduce the use of nickel. Nano-Ni/char reached high catalytic activity at relatively low reaction temperatures.

We claim:

1. A method of removing tars from a syngas stream and conditioning said syngas stream comprising the steps of:
    providing a catalyst comprising a dry, uncalcined physical mixture of discrete particles of a catalytic material and char, wherein said char is not impregnated with said catalytic material;
    contacting a syngas-containing stream having tars present therein with said catalyst under conditions for converting at least a portion of the tars into syngas components.

2. The method according to claim 1, wherein said catalytic material comprises NiO.

3. The method according to claim 1, wherein said contacting step results in the increase of at least one of the hydrogen and carbon monoxide levels in said syngas-containing stream.

4. The catalyst according to claim 1, wherein said catalytic material comprises between about 0.01 to about 30% by weight of said catalyst.

5. The method according to claim 1, wherein said contacting step occurs at a temperature of between about 600 to about 900° C.

6. The method according to claim 1, wherein said catalytic material comprises a member selected from the group consisting of the oxides of alkali and transition metals.

7. A system for removing tars from a syngas stream and conditioning said syngas stream comprising:
    a reactor vessel comprising a quantity of a catalyst comprising a dry, uncalcined physical mixture of discrete particles of a catalytic material and char, wherein said char is not impregnated with said catalytic material; and
    a source of syngas operably connected with said reactor vessel, said syngas having tars present therein.

8. The system according to claim 7, wherein said catalytic material comprises NiO.

9. The system according to claim 7, wherein said catalytic material comprises between about 0.01 to about 30% by weight of said catalyst.

10. The system according to claim 7, wherein said reactor vessel operates at a temperature of between about 600 to about 900° C.

11. The system according to claim 7, wherein said source of syngas is a biomass gasification unit.

12. The system according to claim 7, wherein said catalytic material comprises a member selected from the group consisting of the oxides of alkali and transition metals.

* * * * *